(12) United States Patent
Okada

(10) Patent No.: US 11,989,892 B2
(45) Date of Patent: May 21, 2024

(54) INFORMATION PROCESSING APPARATUS AND INFORMATION PROCESSING METHOD

(71) Applicant: SONY CORPORATION, Tokyo (JP)

(72) Inventor: Ryohei Okada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 553 days.

(21) Appl. No.: 17/250,577

(22) PCT Filed: Jul. 26, 2019

(86) PCT No.: PCT/JP2019/029364
§ 371 (c)(1),
(2) Date: Feb. 4, 2021

(87) PCT Pub. No.: WO2020/031741
PCT Pub. Date: Feb. 13, 2020

(65) Prior Publication Data
US 2021/0295538 A1    Sep. 23, 2021

(30) Foreign Application Priority Data

Aug. 10, 2018  (JP) ................................. 2018-151787

(51) Int. Cl.
*G06T 7/246*   (2017.01)
*G06T 7/40*    (2017.01)
(Continued)

(52) U.S. Cl.
CPC ................ *G06T 7/251* (2017.01); *G06T 7/40* (2013.01); *G06T 7/70* (2017.01); *G06T 13/40* (2013.01)

(58) Field of Classification Search
CPC .. G06T 7/251; G06T 7/70; G06T 7/40; G06T 13/40
See application file for complete search history.

(56) References Cited

U.S. PATENT DOCUMENTS

2012/0056800 A1* 3/2012 Williams ............. G06V 40/103
345/156
2014/0347470 A1* 11/2014 Zhang .................. G06T 3/4038
382/104

(Continued)

FOREIGN PATENT DOCUMENTS

AU      2015358289 A1   6/2017
CA         2969762 A1   6/2016
(Continued)

OTHER PUBLICATIONS

International Search Report and Written Opinion of PCT Application No. PCT/JP2019/029364, dated Oct. 15, 2019, 08 pages of ISRWO.

(Continued)

*Primary Examiner* — Myron Wyche
(74) *Attorney, Agent, or Firm* — CHIP LAW GROUP

(57) ABSTRACT

The present disclosure relates to an information processing apparatus, an information processing method, and a program that enable more efficient acquisition of high-quality textures. A motion generation unit generates, on the basis of a state of acquisition of textures that constitute a 3D model of a user, a motion for imaging an area where the textures have not been acquired. Then, a navigation execution unit provides a navigation for making the user execute an action in accordance with the motion generated by the motion generation unit. The present technology can be applied to, for example, an information processing apparatus that performs 3D model generation processing.

9 Claims, 22 Drawing Sheets

(51) Int. Cl.
    *G06T 7/70*     (2017.01)
    *G06T 13/40*     (2011.01)

(56) References Cited

U.S. PATENT DOCUMENTS

| | | |
|---|---|---|
| 2017/0273639 A1 | 9/2017 | Iscoe et al. |
| 2018/0189550 A1 | 7/2018 | Mccombe |
| 2019/0026932 A1 | 1/2019 | Kishi et al. |
| 2020/0368616 A1 * | 11/2020 | Delamont ............ H04N 13/239 |

FOREIGN PATENT DOCUMENTS

| | | | |
|---|---|---|---|
| CN | 103226843 | A | 7/2013 |
| CN | 103679797 | A | 3/2014 |
| CN | 106650217 | A | 5/2017 |
| CN | 106999107 | A | 8/2017 |
| CN | 108780580 | A | 11/2018 |
| CN | 110223272 | A | 9/2019 |
| DE | 15864375 | T1 | 2/2018 |
| EP | 3226763 | A1 | 10/2017 |
| ES | 2647340 | T1 | 12/2017 |
| JP | 2014-525108 | A | 9/2014 |
| JP | 2017-80201 | A | 5/2017 |
| JP | 2017-107503 | A | 6/2017 |
| JP | 2017-162119 | A | 9/2017 |
| JP | 2018-504663 | A | 2/2018 |
| KR | 10-2017-0038722 | A | 4/2017 |
| KR | 10-2017-0091730 | A | 8/2017 |
| KR | 10-2018-0057734 | A | 5/2018 |
| KR | 10-2019-0007535 | A | 1/2019 |
| SG | 11201703993 | R | 6/2017 |
| SG | 10201806180 | A | 8/2018 |
| WO | 2016/086266 | A1 | 6/2016 |
| WO | 2017/154894 | A1 | 9/2017 |

OTHER PUBLICATIONS

"IphoneX hands-on experience FaceID has cured my years of cervical spondylosis", Raise your chopsticks and spread your legs, https://www.bilibili.com/video/av 16070143/, video 0:00-0:40, Nov. 6, 2017.

\* cited by examiner

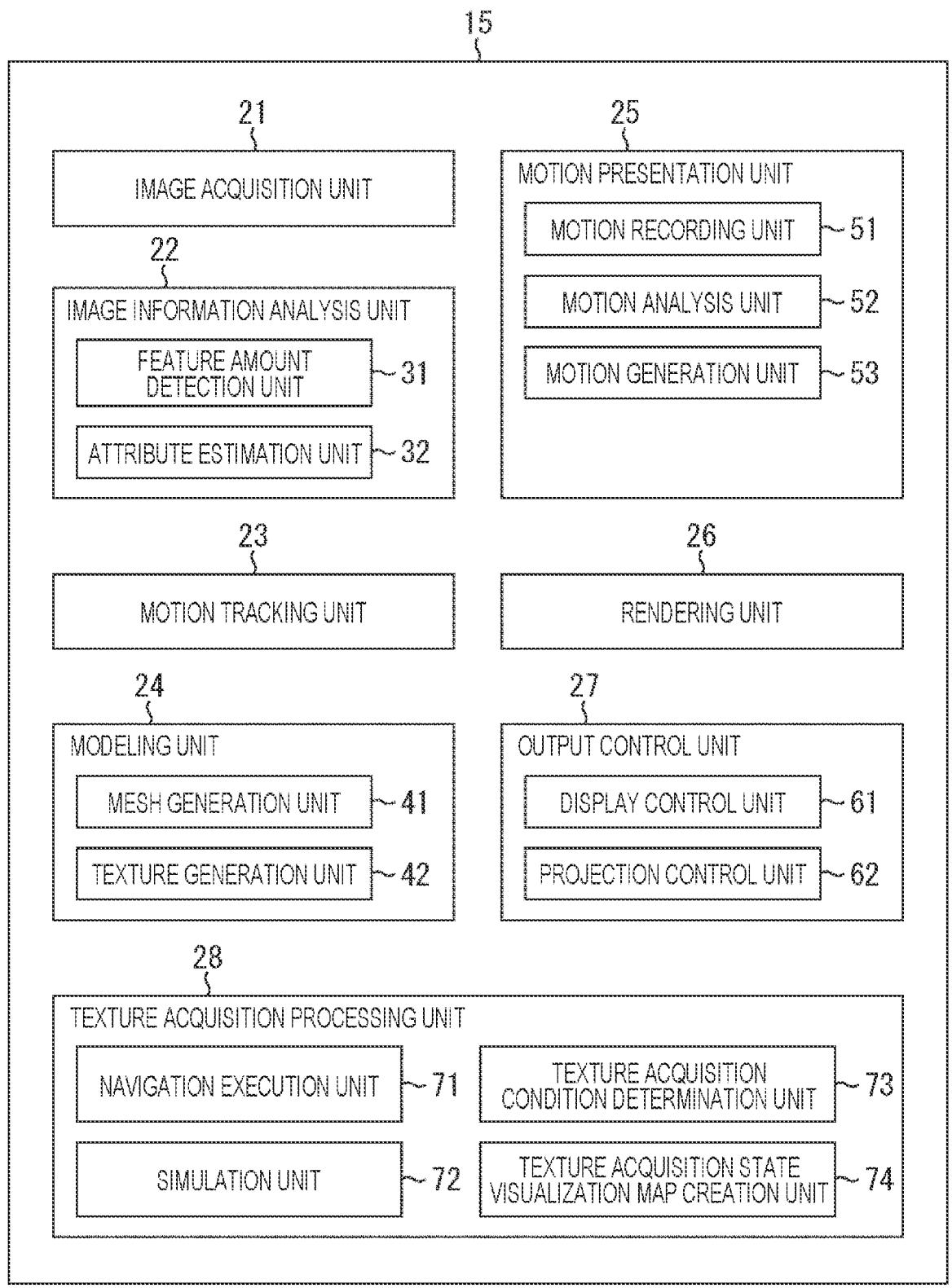

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/029364 filed on Jul. 26, 2019, which claims priority benefit of Japanese Patent Application No. JP 2018-151787 filed in the Japan Patent Office on Aug. 10, 2018. Each of the above-referenced applications is hereby incorporated herein by reference in its entirety.

TECHNICAL FIELD

The present disclosure relates to an information processing apparatus, an information processing method, and a program, and more particularly to an information processing apparatus, an information processing method, and a program that enable more efficient acquisition of high-quality textures.

BACKGROUND ART

In recent years, a variety of technologies for scanning a three-dimensional shape of a person and generating a 3D model of that person have been proposed and put into practical use. For example, a 3D model is constituted by a mesh that represents a three-dimensional shape as a set of polygons such as triangles and quadrangles, and textures constituted by an image that represents a color of the surface of the three-dimensional shape.

Conventionally, as a technique for acquiring textures, a system for acquiring textures has been used in which 100 or more imaging devices are installed so as to surround a person, and the imaging devices are synchronized to image the person. However, such a system is costly.

Furthermore, a system for acquiring textures has been used in which a person who is rotating on a turntable is imaged with one imaging device. However, such a system requires a person to remain stationary for several minutes.

For example, Patent Document 1 discloses a technology of generating a high-density avatar mesh by multi-view stereo and applying multi-view texture composition to generate a texture image associated with a 3D face model.

CITATION LIST

Patent Document

Patent Document 1: Japanese Unexamined Patent Application Publication (Translation of PCT Application) No. 2014-525108

SUMMARY OF THE INVENTION

Problems to be Solved by the Invention

Meanwhile, it has conventionally been difficult to acquire textures that cover the entire area of the surface of a person because, when the textures are acquired, an area where the textures cannot be acquired (hereinafter referred to as an occlusion area) is generated. On the other hand, in order to suppress generation of an occlusion area and acquire high-quality textures with a high coverage rate, it is necessary to make a person perform a special movement specialized for imaging of an occlusion area, and it has been difficult to acquire the textures efficiently.

The present disclosure has been made in view of such a situation, and is intended to enable more efficient acquisition of high-quality textures.

Solutions to Problems

One aspect of the present disclosure provides an information processing apparatus including a motion generation unit that generates, on the basis of a state of acquisition of textures that constitute a 3D model of a user, a motion for imaging an area where the textures have not been acquired, and a navigation execution unit that provides a navigation for making the user execute an action in accordance with the motion generated by the motion generation unit.

The one aspect of the present disclosure provides an information processing method or a program including, generating, on the basis of a state of acquisition of textures that constitute a 3D model of a user, a motion for imaging an area where the textures have not been acquired, and providing a navigation for making the user execute an action in accordance with the generated motion.

In the one aspect of the present disclosure, on the basis of a state of acquisition of textures that constitute a 3D model of a user, a motion for imaging an area where the textures have not been acquired is generated, and a navigation for making the user execute an action in accordance with the motion is provided.

Effects of the Invention

According to the one aspect of the present disclosure, it is possible to acquire high-quality textures more efficiently.

Note that the effects described here are not necessarily restrictive, and the effects of the invention may be any one of the effects described in the present disclosure.

BRIEF DESCRIPTION OF DRAWINGS

FIG. 5 is a block diagram illustrating a configuration example of an embodiment of an information processing apparatus.

FIG. 11 illustrates an example of a motion that allows for reliable acquisition of textures of a sole of a foot or the like.

FIG. 12 illustrates an example of a motion that allows for reliable acquisition of textures of a top of a head, armpits, and the like.

FIG. 13 illustrates an example of a motion that allows for reliable acquisition of the textures of the top of the head, the armpits, and the like.

MODE FOR CARRYING OUT THE INVENTION

Specific embodiments to which the present technology is applied will be described below in detail with reference to the drawings.

<Configuration Example of Information Processing System>

Figure 1:
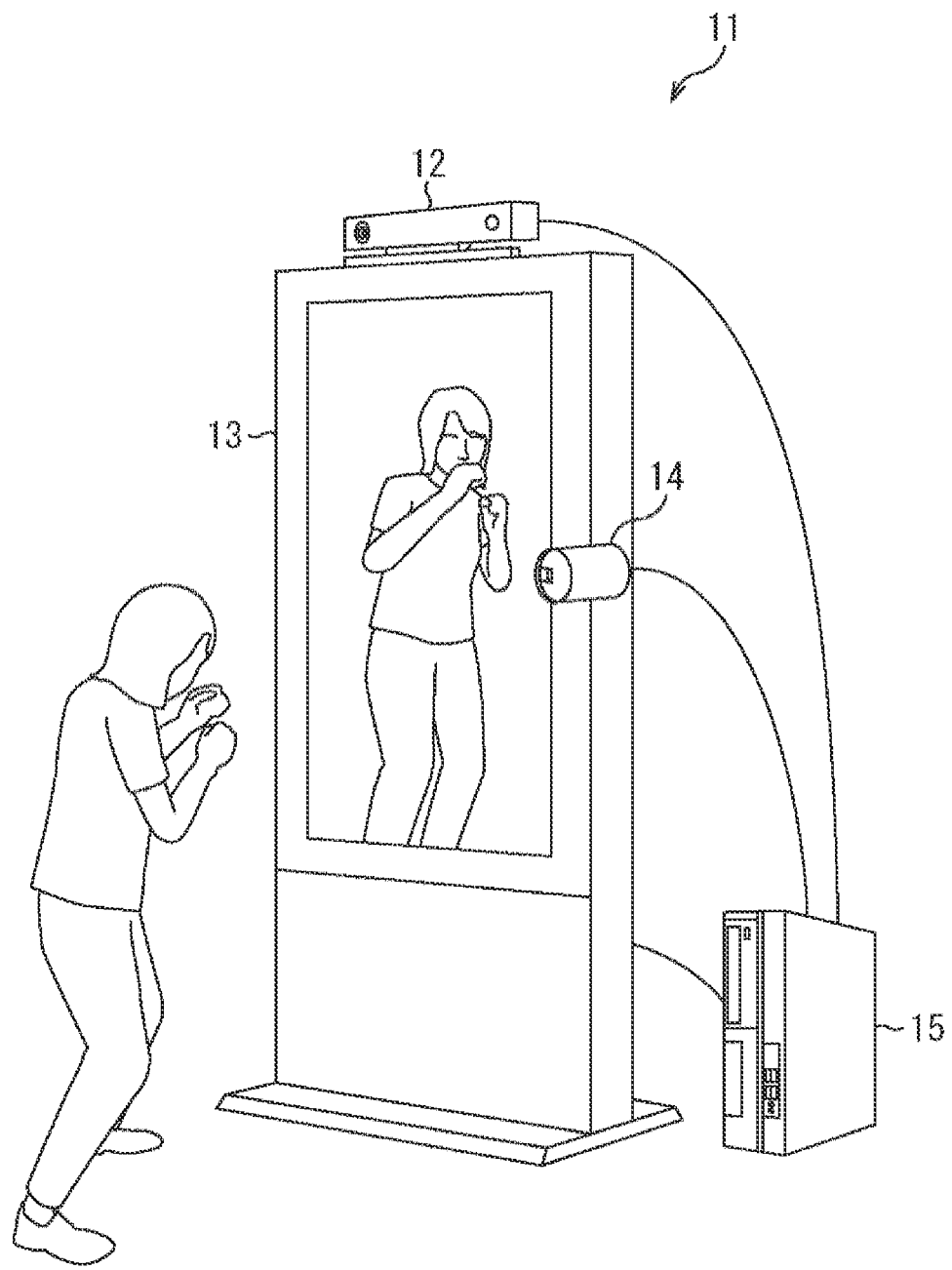
FIG. 1 illustrates a first configuration example of a 3D image system.

FIG. 1 illustrates a first configuration example of a 3D image system.

As illustrated in FIG. 1, a 3D image system 11 includes a sensing device 12, a display device 13, a projector 14, and an information processing apparatus 15.

The sensing device 12 includes an RGB camera capable of capturing a color image and a depth camera capable of acquiring a depth image in which depth information is mapped. Then, the sensing device 12 captures a color image with a user on the front side of the display device 13 as a sensing target, acquires a depth image representing a depth with respect to the user, and supplies the depth image to the information processing apparatus 15.

The display device 13 displays, for example, a computer graphics (CG) image obtained by rendering a user's 3D model in accordance with control by the information processing apparatus 15.

In accordance with control by the information processing apparatus 15, the projector 14 projects, onto a floor surface, a guide image (e.g., an arrow in FIGS. 21A and 21B described later) for guiding a user to a range where the sensing device 12 can perform sensing, for example. Note that, instead of using the display device 13, for example, the projector 14 may be configured to project a CG image obtained by rendering a user's 3D model onto a wall surface, a screen, or the like.

The information processing apparatus 15 is, for example, a personal computer having a 3D graphics function. Then, the information processing apparatus 15 generates a user's 3D model on the basis of a color image and a depth image supplied from the sensing device 12, and causes the display device 13 to display a CG image obtained by rendering the 3D model. Note that a detailed configuration of the information processing apparatus 15 will be described later with reference to FIG. 5.

The 3D image system 11 having such a configuration allows a user to generate, while viewing a CG image displayed on the display device 13, a 3D model in accordance with a navigation in which the CG image is used.

Figure 2:
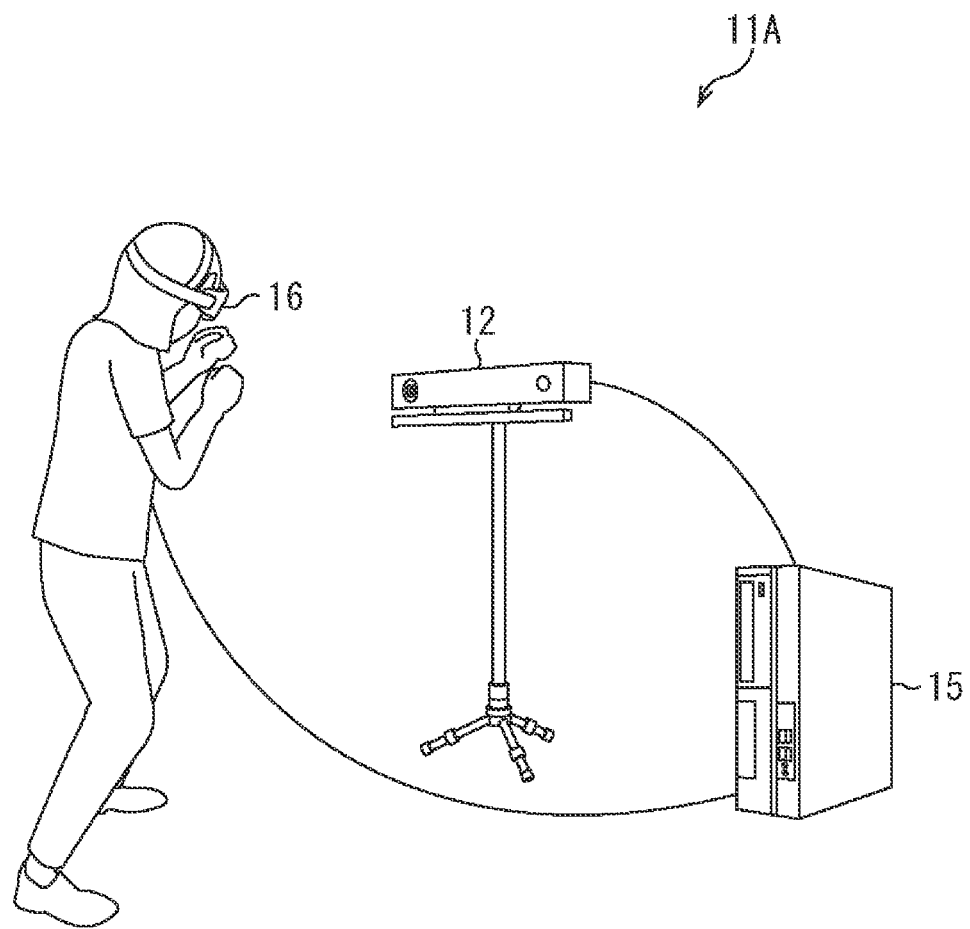
FIG. 2 illustrates a second configuration example of a 3D image system.

FIG. 2 illustrates a second configuration example of a 3D image system. Note that, of the configurations of a 3D image system 11A illustrated in FIG. 2, those that are the same as the configurations of the 3D image system 11 in FIG. 1 are designated by the same reference numerals, and detailed description thereof will be omitted.

For example, the 3D image system 11A includes the sensing device 12 and the information processing apparatus 15, which are the same configurations as those of the 3D image system 11 in FIG. 1. On the other hand, the 3D image system 11A includes a head-mounted display 16 instead of the display device 13 and the projector 14, which is the difference in configuration from the 3D image system 11 in FIG. 1. That is, a CG image, a guide image, or the like as described above is displayed on the head-mounted display 16 worn by a user.

Thus, the 3D image system 11A allows the user to generate, while viewing the CG image displayed on the head-mounted display 16, a 3D model in accordance with a navigation in which the CG image is used.

The 3D image systems 11 and 11A having such a configuration generate a user's 3D model in the information processing apparatus 15 by using a color image and a depth image acquired by the sensing device 12. At this time, the 3D image systems 11 and 11A can suppress generation of an occlusion area and acquire high-quality textures with a high coverage rate that cover the entire area of the user's surface.

Here, a user's 3D model and an occlusion area generated in textures will be described with reference to FIGS. 3 and 4.

Figure 3:
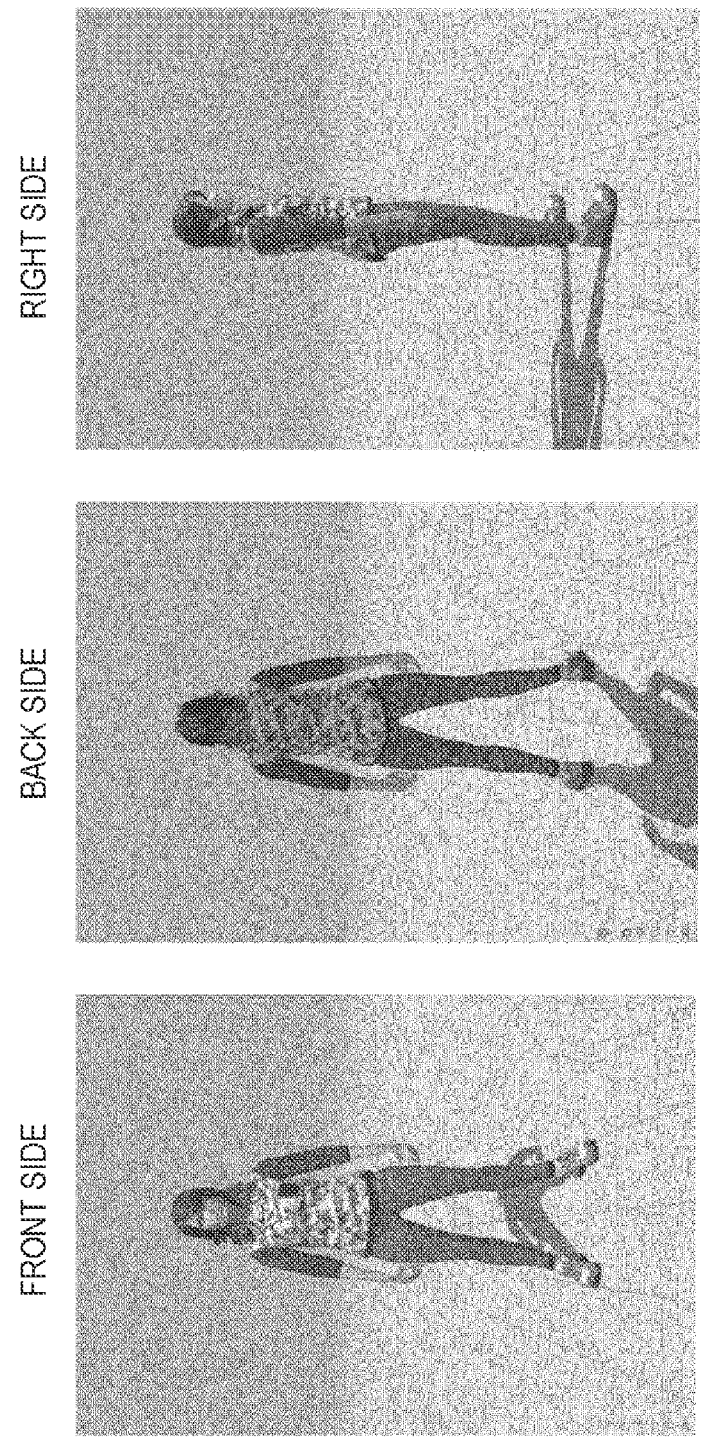
FIG. 3 illustrates an example of a rendering result of a user's 3D model.

For example, FIG. 3 illustrates a CG image obtained by rendering a user in a basic standing posture from the front side, the back side, and the right side as an example of a result of rendering a user's 3D model created by the information processing apparatus 15.

When a user is in a standing posture as described above, it is extremely difficult to image the user's armpits, crotch, and the like with the RGB camera of the sensing device 12. Thus, occlusion areas, which are not noticeable in the CG image illustrated in FIG. 3, are generated in portions that have failed to be imaged with the RGB camera of the sensing device 12.

Figure 4A:
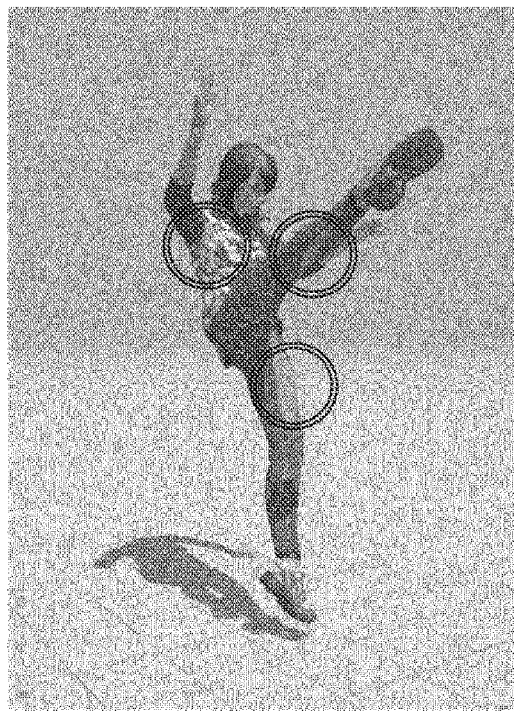
FIGS. 4A and 4B illustrate an example of occlusion that has occurred in textures.
Figure 4B:

FIGS. 4A and 4B illustrate an example of a result of rendering a 3D model so that the posture makes the portions where the occlusion areas have been generated noticeable. For example, the portions indicated by circles in FIG. 4A and FIG. 4B are where occlusion areas that have not been filled with textures have occurred.

Thus, in the 3D image systems 11 and 11A, the information processing apparatus 15 provides a navigation to a user so that occlusion does not occur, and executes 3D model generation processing to acquire textures and generate a 3D model.

<Configuration Example of Information Processing Apparatus>

FIG. 5 is a block diagram illustrating a configuration example of an embodiment of an information processing apparatus to which the present technology is applied.

As illustrated in FIG. 5, the information processing apparatus 15 includes an image acquisition unit 21, an image information analysis unit 22, a motion tracking unit 23, a modeling unit 24, a motion presentation unit 25, a rendering unit 26, an output control unit 27, and a texture acquisition processing unit 28.

The image acquisition unit 21 acquires a color image and a depth image output from the sensing device 12 in FIG. 1 or FIG. 2. Then, the image acquisition unit 21 supplies the color image and the depth image to the image information analysis unit 22, the motion tracking unit 23, the modeling unit 24, and the texture acquisition processing unit 28 as needed.

The image information analysis unit 22 includes a feature amount detection unit 31 and an attribute estimation unit 32, and performs processing of analyzing the color image and the depth image supplied from the image acquisition unit 21.

The feature amount detection unit 31 analyzes the color image and the depth image of a user acquired by the image acquisition unit 21, and detects a feature amount of the user.

The attribute estimation unit 32 analyzes the color image and the depth image of the user acquired by the image acquisition unit 21, and estimates, for example, the user's gender, age, and the like, and the user's proficiency level (beginner, experienced user, professional, or the like) as attributes of the user.

The motion tracking unit 23 performs motion tracking to follow an action of the user from the color image and the depth image of the user acquired by the image acquisition unit 21. For example, the motion tracking unit 23 can perform the motion tracking to determine whether or not the user's action in accordance with a motion presented to the user has been completed.

The modeling unit 24 includes a mesh generation unit 41 and a texture generation unit 42, and generates a 3D model of the user on the basis of the color image and the depth image supplied from the image acquisition unit 21.

The mesh generation unit 41 generates a mesh that represents a three-dimensional shape of the user as a set of polygons on the basis of a depth represented by the depth image, for example.

The texture generation unit 42 cuts out, for example, an area where the user is shown in the color image, and generates textures that represent colors of the surface of the user.

The motion presentation unit 25 includes a motion recording unit 51, a motion analysis unit 52, and a motion generation unit 53, and performs processing of presenting a motion for acquiring textures with a higher coverage rate.

A variety of motions necessary to generate a 3D model are recorded in advance in the motion recording unit 51.

The motion analysis unit 52 analyzes the motions recorded in the motion recording unit 51.

The motion generation unit 53 refers to a priority of an area to be filled with textures, factors that have caused a failure to acquire textures, the attributes of the user, a proficiency level of a movement, and the like, and generates an appropriate motion for filling the area with the textures.

The rendering unit 26 applies the motion supplied from the motion presentation unit 25 to the 3D model generated by the modeling unit 24 to perform rendering, and generates a CG image of the user's 3D model.

The output control unit 27 includes a display control unit 61 and a projection control unit 62, and performs, for example, processing of controlling an output to the display device 13 and the projector 14 in FIG. 1 and the head-mounted display 16 in FIG. 2.

The display control unit 61 controls the display device 13 (the projector 14 in a case where the display device 13 is not used) or the head-mounted display 16 to display the CG image of the user's 3D model generated by the rendering unit 26.

The projection control unit 62 controls the projector 14 or the head-mounted display 16 to project a guide image (e.g., an arrow in FIGS. 21A and 21B described later) for guiding the user.

The texture acquisition processing unit 28 includes a navigation execution unit 71, a simulation unit 72, a texture acquisition condition determination unit 73, and a texture acquisition state visualization map creation unit 74, and performs various types of processing necessary for acquiring higher quality textures.

The navigation execution unit 71 performs a registration work necessary for acquiring textures, and provides a navigation for execution of an appropriate action. For example, when a 3D model is generated, the navigation execution unit 71 registers some motions of warm-up exercises performed in a usual workout in a database of the motion recording unit 51. At that time, the navigation execution unit 71 also registers an event, an age group, a reproduction difficulty level (proficiency level), and the like as a target of the action. Furthermore, the navigation execution unit 71 provides a navigation on an occlusion area, an optimum position (orientation), a speed of movement, and the like so that the user can perform an appropriate motion for filling the occlusion area with textures generated by the motion generation unit 53.

The simulation unit 72 performs an analysis in accordance with a motion presented to the user and then registered at the time of generation of the 3D model. For example, the motion analysis unit 52 simulates, with a virtual camera, an action based on the registered motion, and calculates the user's position, the user's orientation, the timing at which the user moves, and the like that minimize an angle ($\theta$ in FIG. 7) between each polygon normal constituting the mesh and a principal axis of the RGB camera of the sensing device 12.

As will be described later with reference to FIGS. 7 and 8, the texture acquisition condition determination unit 73 determines whether or not textures have been appropriately acquired for each polygon of the mesh, and determines, in accordance with a result of the determination, whether or not a texture acquisition condition (e.g., a coverage rate) set in advance has been achieved.

The texture acquisition state visualization map creation unit 74 creates a texture acquisition state visualization map on the basis of the result of the determination by the texture acquisition condition determination unit 73. Note that the texture acquisition state visualization map created by the texture acquisition state visualization map creation unit 74 will be described later with reference to FIG. 18.

<3D Model Generation Processing>

Figure 6:
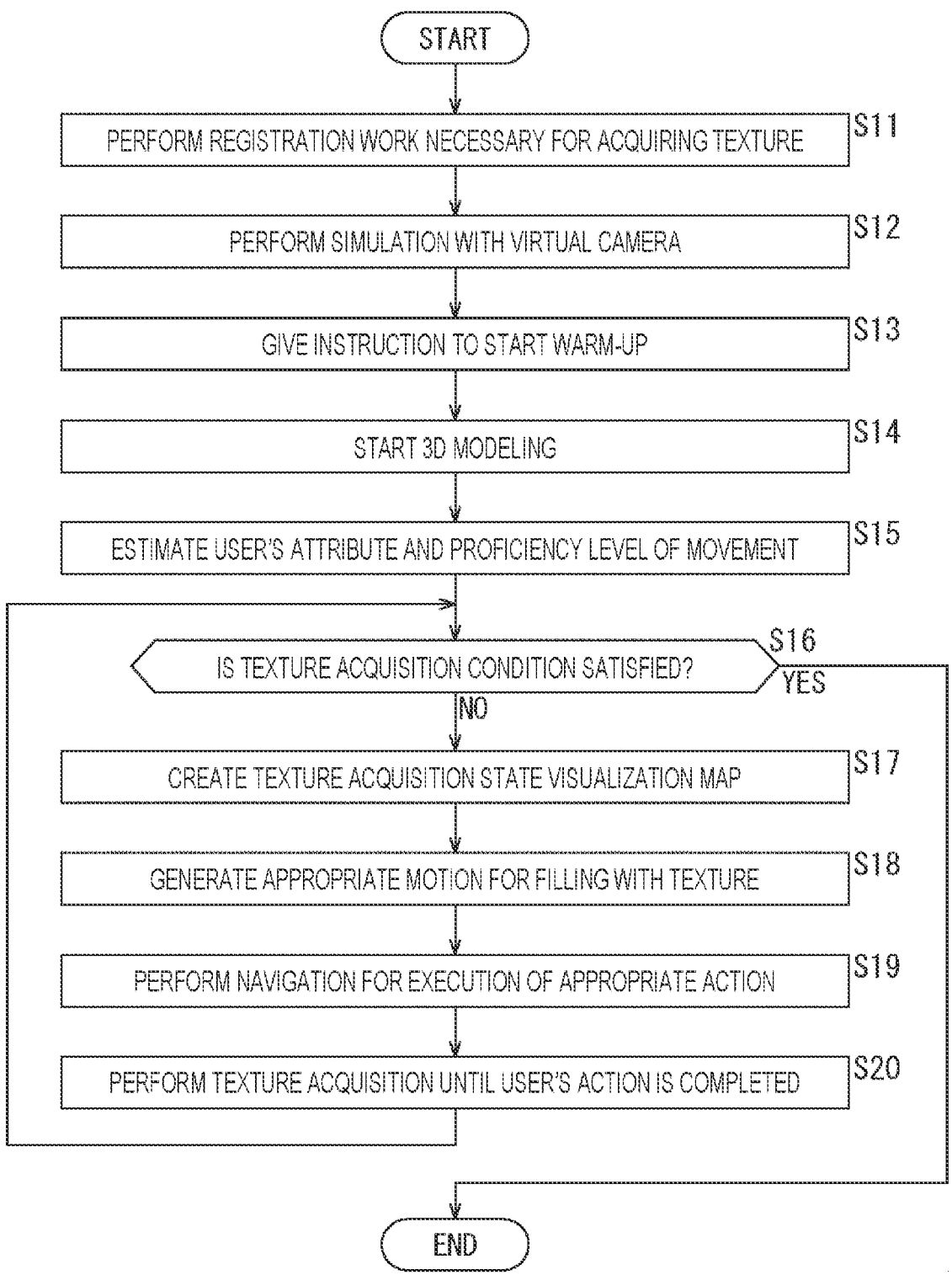
FIG. 6 is a flowchart illustrating 3D model generation processing.

The 3D model generation processing to be executed by the information processing apparatus 15 will be described with reference to a flowchart illustrated in FIG. 6.

In step S11, the navigation execution unit 71 performs a registration work necessary for acquiring textures. For example, at the time of re-imaging for reacquiring the textures, the navigation execution unit 71 registers an action (such as a normal warm-up movement) a user is instructed to perform, a target, a reproduction difficulty level, a priority of an area to be filled with textures, a texture acquisition condition, and the like.

In step S12, from the action registered in step S11, the simulation unit 72 calculates, by a simulation, a position (orientation) and a timing at which an angle $\theta$ formed by a principal axis VD of the RGB camera of the sensing device 12 and a polygon normal SN is minimized.

In step S13, the navigation execution unit 71 provides a navigation for instructing the user to start a warm-up.

In step S14, in the modeling unit 24, the mesh generation unit 41 starts to generate a mesh, and the texture generation unit 42 starts to generate textures. Thus, 3D modeling is started with use of a color image and a depth image of the user who is performing a warm-up action. At this time, a determination by the texture acquisition condition determination unit 73 is also started, and a creation of a texture acquisition state visualization map by the texture acquisition state visualization map creation unit 74 is also started.

In step S15, the attribute estimation unit 32 estimates the user's attribute and proficiency level of the movement from the color image and the depth image of the user captured by the sensing device 12.

Thereafter, the user is requested to freely perform an action for a certain period of time. Then, in step S16, the texture acquisition condition determination unit 73 determines whether or not the texture acquisition condition is satisfied.

If the texture acquisition condition determination unit 73 determines in step S16 that the texture acquisition condition is not satisfied, the processing proceeds to step S17.

In step S17, on the basis of a result of determination on whether or not textures have been appropriately acquired for each polygon of the mesh, the texture acquisition state visualization map creation unit 74 creates the texture acquisition state visualization map by calculating and visualizing an occlusion area, for example. In the texture acquisition state visualization map, as will be described later with reference to FIG. 18, a classification is performed for each of the factors that have caused a failure to acquire textures, such as insufficient time and insufficient angle, and these factors are visualized.

In step S18, the motion generation unit 53 refers to the priority of the area to be filled with textures, the user's attribute and proficiency level of the movement, and the like registered in step S11, and generates an appropriate motion for filling the area with the textures. At this time, the motion generation unit 53 also refers to the factors that have caused a failure to acquire textures in the texture acquisition state visualization map created in step S17.

In step S19, the navigation execution unit 71 provides a navigation for execution of an appropriate action such as an occlusion area, an optimum position (orientation), and a speed of movement so that the user can perform the motion generated in step S18.

In step S20, textures are acquired from a color image obtained by imaging the user executing the appropriate action in accordance with the navigation in step S19. Then, when the user's action in accordance with the motion generated in step S18 is completed, the processing returns to step S16.

After that, similar processing is repeated, and if the texture acquisition condition determination unit 73 determines in step S16 that the texture acquisition condition is satisfied, the processing ends.

It is assumed that such 3D model generation processing is used for, for example, remote instruction from a training gym. For example, a user's 3D model can be created so that a well-known trainer in a remote location can check a form of the user and provide feedback. Furthermore, the motion to be registered in the database may be registered by the user's trainer.

Moreover, motion simulation data described later may be accumulated in a database and opened to public, so that a motion that allows for acquisition of effective textures and high coverage or a motion that is frequently selected can be shared.

<Texture Determination>

A determination condition for determining whether or not textures have been appropriately acquired will be described with reference to FIGS. 7 to 9.

Figure 7:
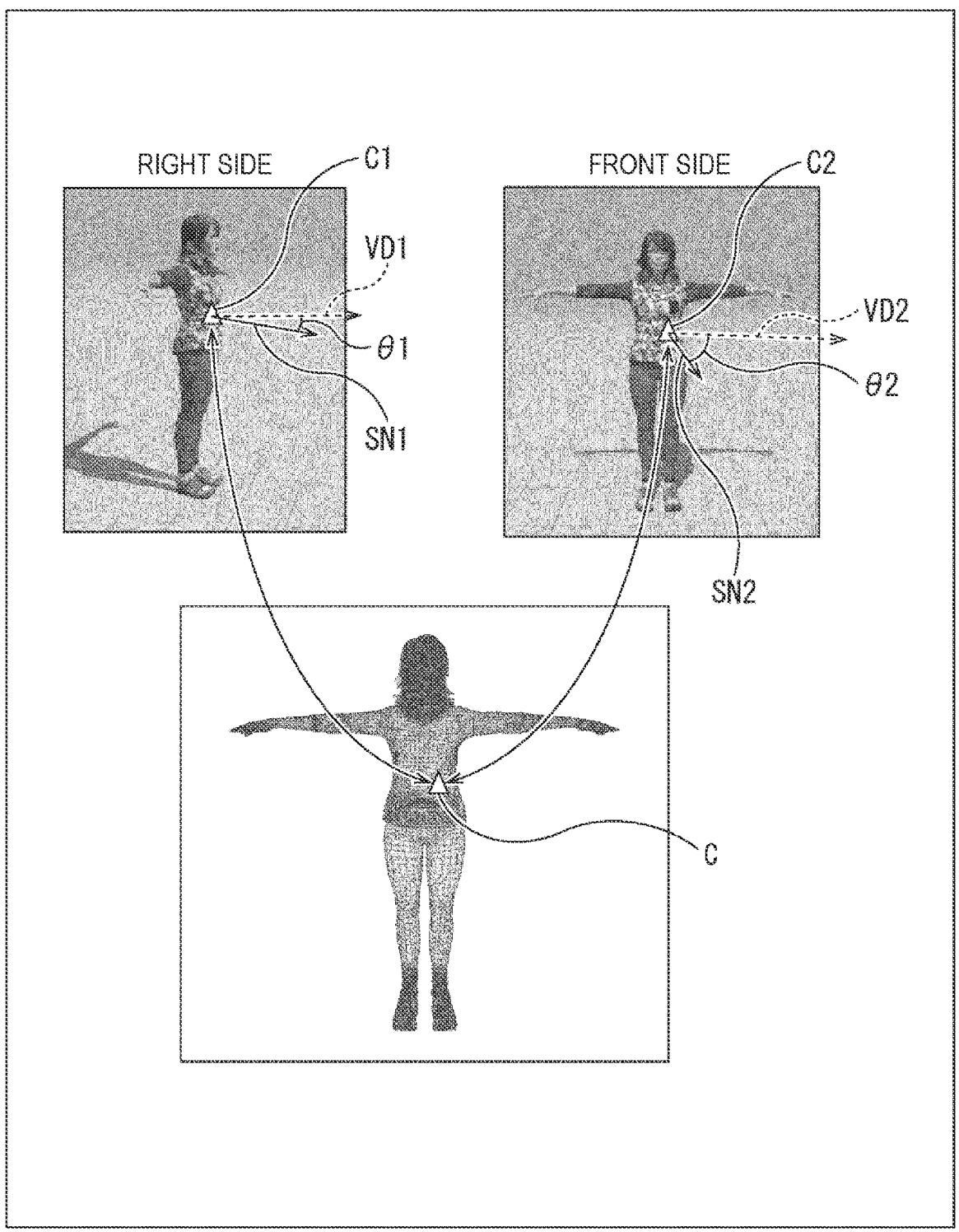
FIG. 7 illustrates a determination condition for determining whether or not textures have been appropriately acquired.
Figure 8:
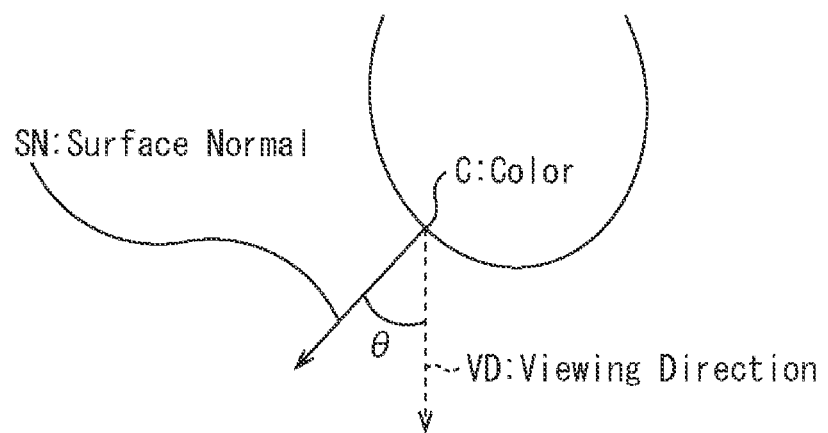
FIG. 8 illustrates an angle $\theta$ formed by a principal axis VD of an RGB camera of a sensing device and a polygon normal SN.

FIG. 7 illustrates an example of generating a texture from a right side image and a front image of a user for each triangular polygon constituting a mesh of the user as illustrated in a lower part in FIG. 7.

For example, a polygon color C is synthesized from a polygon color C1 shown in the user's right side image and a polygon color C2 shown in the user's front image (e.g., an average value).

Then, as a determination condition for determining whether or not a texture has been appropriately acquired for a certain polygon, it is possible to use a distance d from the RGB camera of the sensing device 12 to the polygon, the angle θ formed by the principal axis VD of the RGB camera of the sensing device 12 and the polygon normal SN, or a time t during which the polygon has been exposed in front of the RGB camera of the sensing device 12.

The distance d from the RGB camera of the sensing device 12 to the polygon is preferably set to, for example, 0.5 to 2 m as a determination condition. For example, on the basis of the depth image acquired by the image acquisition unit 21, the texture acquisition condition determination unit 73 can determine whether or not the distance d from the RGB camera of the sensing device 12 to the polygon satisfies the determination condition.

The angle θ formed by the principal axis VD of the RGB camera of the sensing device 12 and the polygon normal SN is preferably set to 10° or less as a determination condition. Here, the principal axis VD of the RGB camera of the sensing device 12, the polygon normal SN, and the angle θ have a relationship as illustrated in FIG. 8. For example, the principal axis VD of the RGB camera of the sensing device 12 is known, and the texture acquisition condition determination unit 73 can obtain the polygon normal SN from the mesh.

The time t during which the polygon has been exposed in front of the RGB camera of the sensing device 12 is preferably set to longer than 1 second as a determination condition. For example, on the basis of the color image acquired by the image acquisition unit 21, the texture acquisition condition determination unit 73 can determine whether or not the time t during which the polygon has been exposed in front of the RGB camera of the sensing device 12 satisfies the determination condition.

For example, the texture acquisition condition determination unit 73 calculates an achievement rate of each of the determination condition using the distance d, the determination condition using the angle θ, and the determination condition using the time t. In accordance with this achievement rate, it is possible to determine an area where high-quality textures have been acquired and an area where high-quality textures have not been acquired.

By using the time t during which the polygon has been exposed in front of the RGB camera of the sensing device 12 as the determination condition for determining whether or not textures have been appropriately acquired as described above, it is possible to exclude textures in which there is a high possibility that a blur is left due to a high speed movement of a user, for example.

Figure 9:
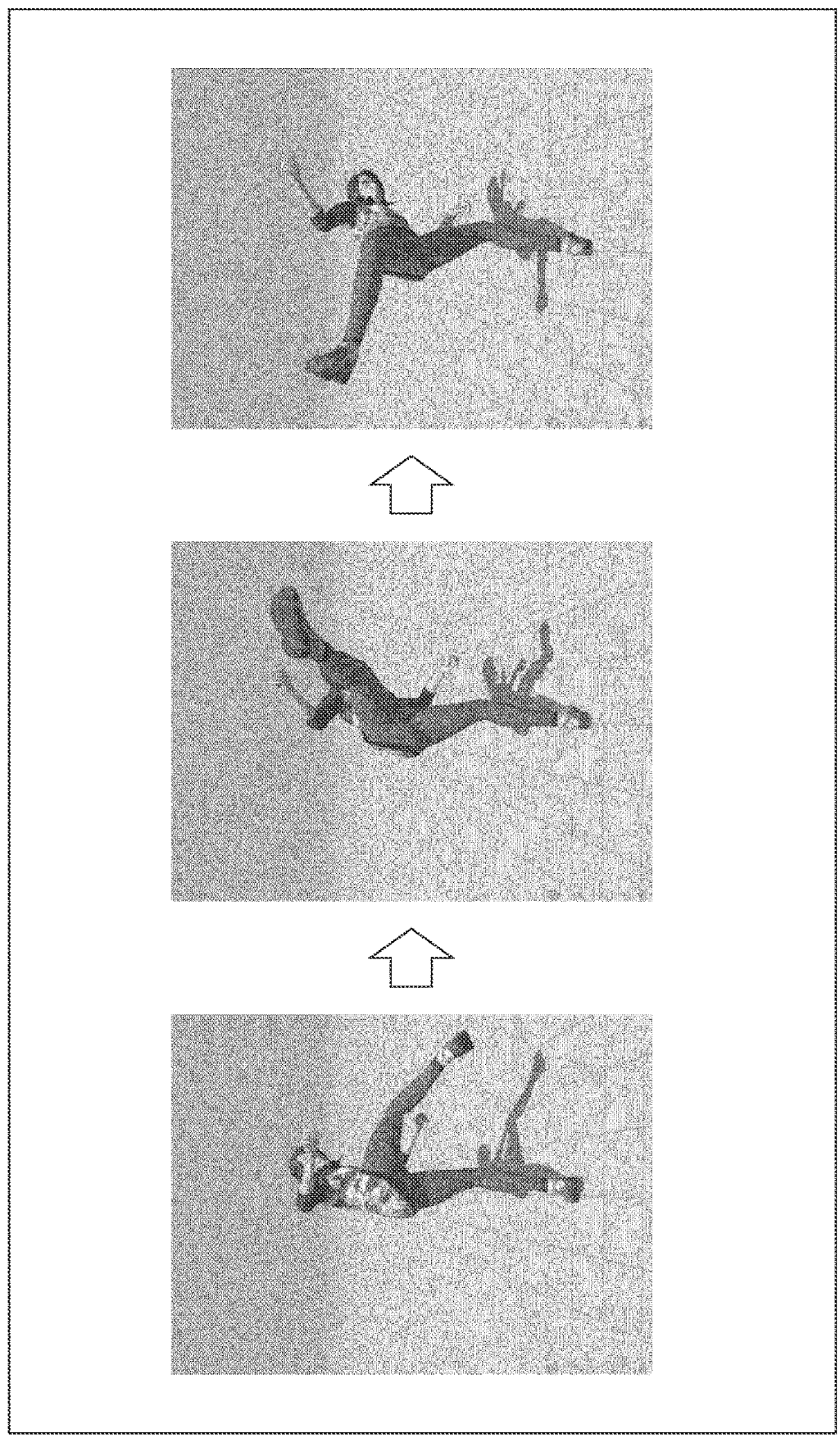
FIG. 9 illustrates an example of a motion that leaves a blur in textures.

For example, in a case of a motion in which a user has moved a sole of a foot at a high speed as illustrated in FIG. 9, there is a high possibility that a blur is left in textures of the sole of the foot, and it is determined that the textures have not been appropriately acquired.

<Method of Navigation>

A method of navigation for acquiring textures while preventing occurrence of an occlusion area will be described with reference to FIGS. 10 to 16.

Figure 10:
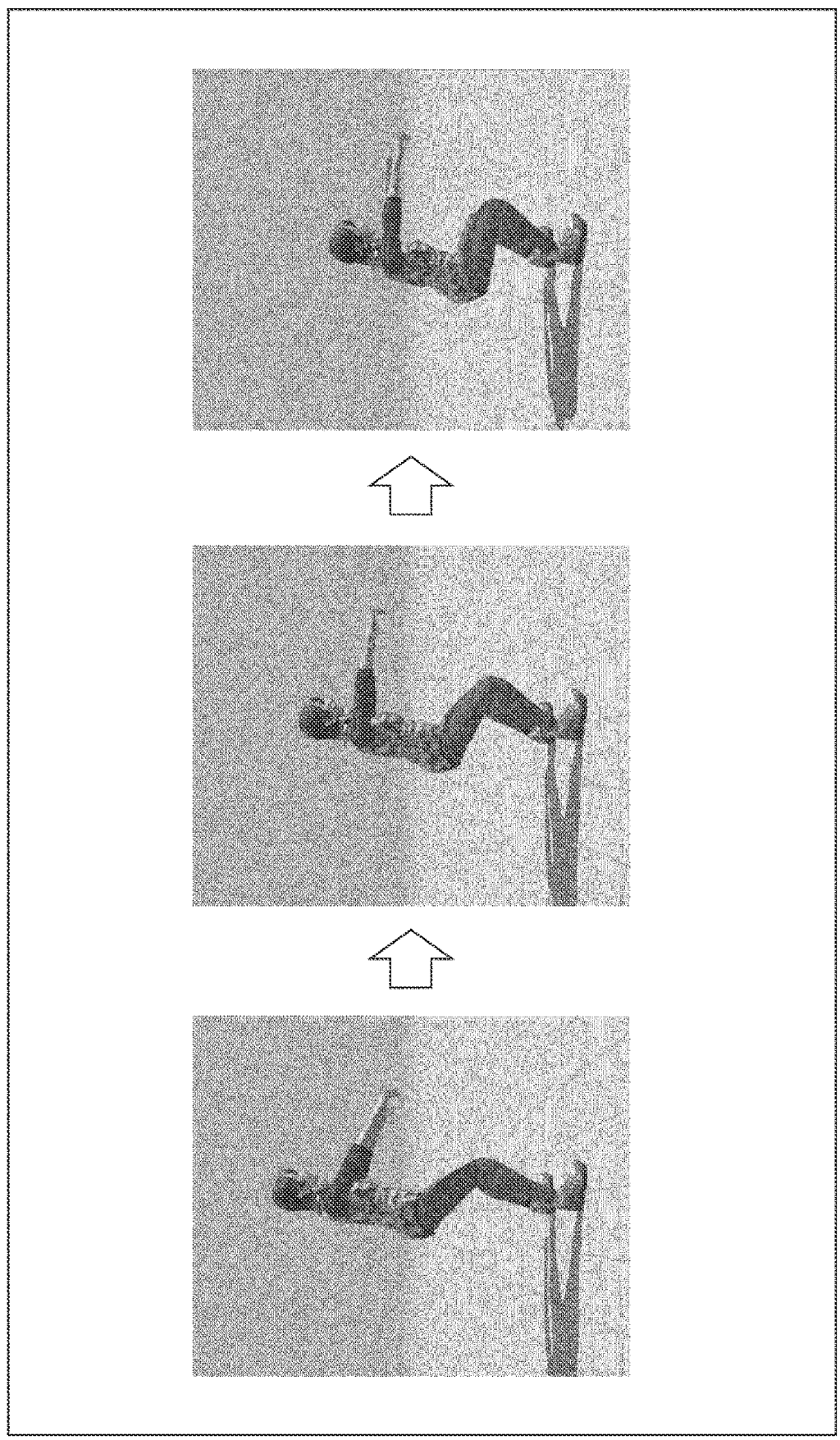
FIG. 10 illustrates an example of a motion that allows for reliable acquisition of textures of a lateral side.

FIG. 10 illustrates an example of a motion that allows for reliable acquisition of textures of a lateral side. For example, imaging from a lateral side a user who is performing a motion of raising and lowering both hands while squatting allows for reliable acquisition of textures of the lateral side. At this time, a slow-tempo motion may be presented so that occurrence of a blur can be suppressed and higher quality textures can be acquired. Note that this motion is common to beginners and experienced users, and the difficulty level is low.

Figure 11:
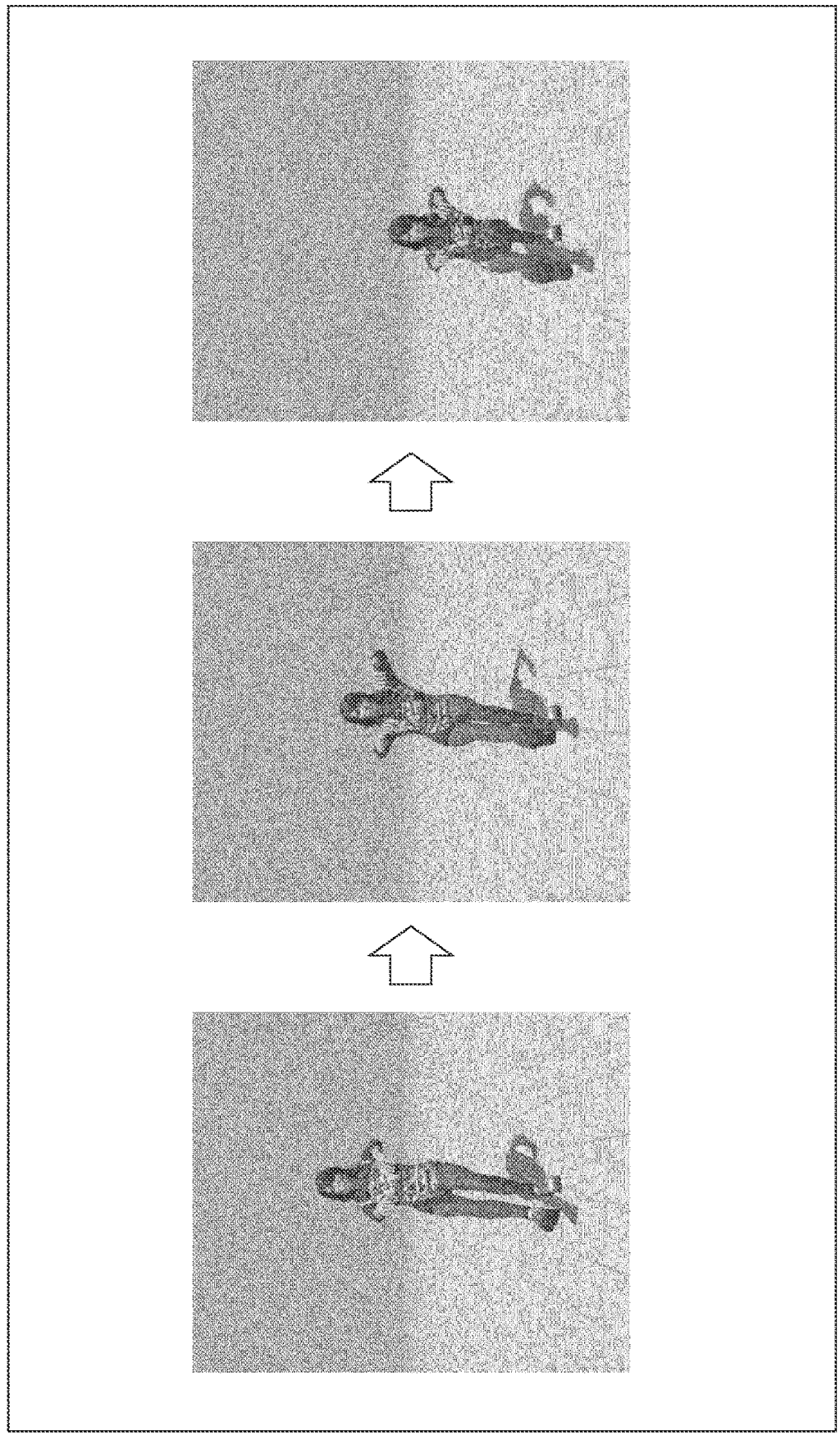

FIG. 11 illustrates an example of a motion that allows for reliable acquisition of textures of a sole of a foot or the like. For example, imaging from the front a user who is performing a motion such as squatting with one leg and turning the sole of the foot of the other leg forward allows for reliable acquisition of textures of the sole of the foot or the like. Note that this motion is for experienced users, and the difficulty level is high.

Figure 12:
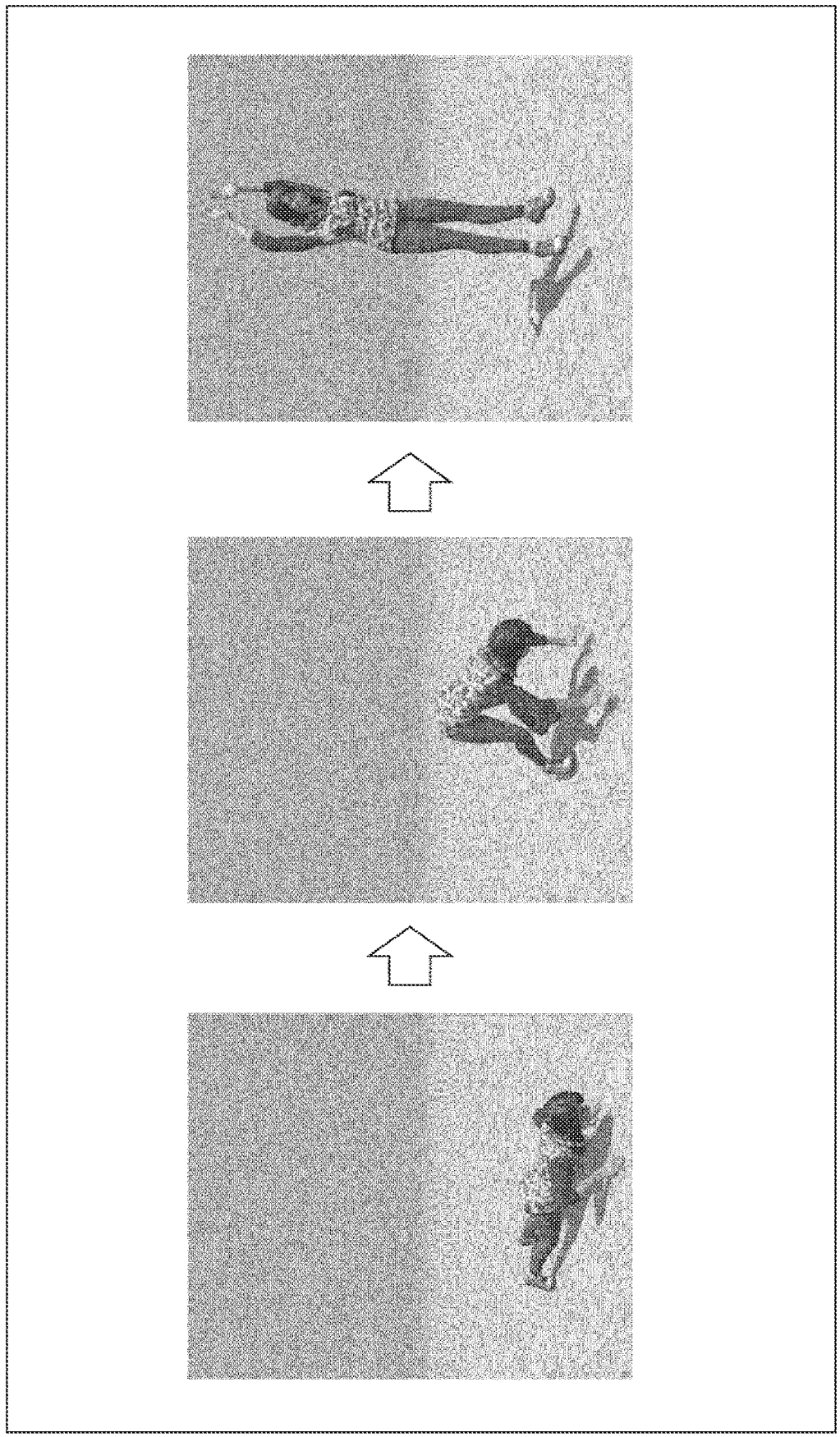

FIG. 12 illustrates an example of a motion that allows for reliable acquisition of textures of a top of a head, armpits, and the like. For example, imaging from the front a user who is lying face-down with the user's head directed toward the front and then performing a motion of standing up and jumping while raising both hands allows for reliable acquisition of the textures of the top of the head, the armpits, and the like. Note that this motion is common to beginners and experienced users, and the difficulty level is low.

Figure 13:
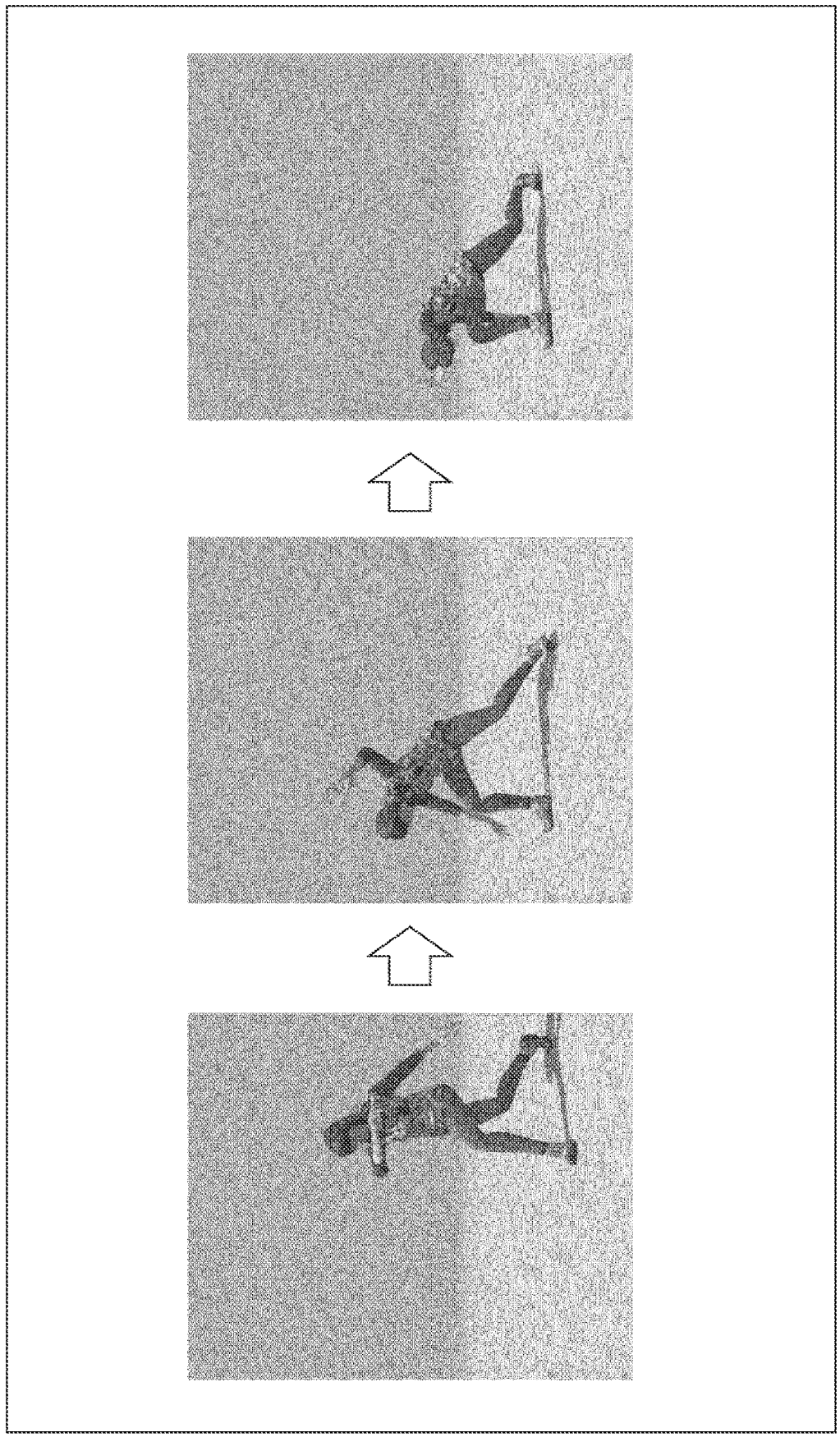

FIG. 13 illustrates an example of a motion that allows for reliable acquisition of the textures of the top of the head, the armpits, and the like. For example, imaging from the front a user who is performing a motion of touching the floor on the outside of a foot with one hand while fully swinging both arms from side to side allows for reliable acquisition of the textures of the top of the head, the armpits, and the like. Note that this motion is for experienced users, and the difficulty level is high.

Figure 14:
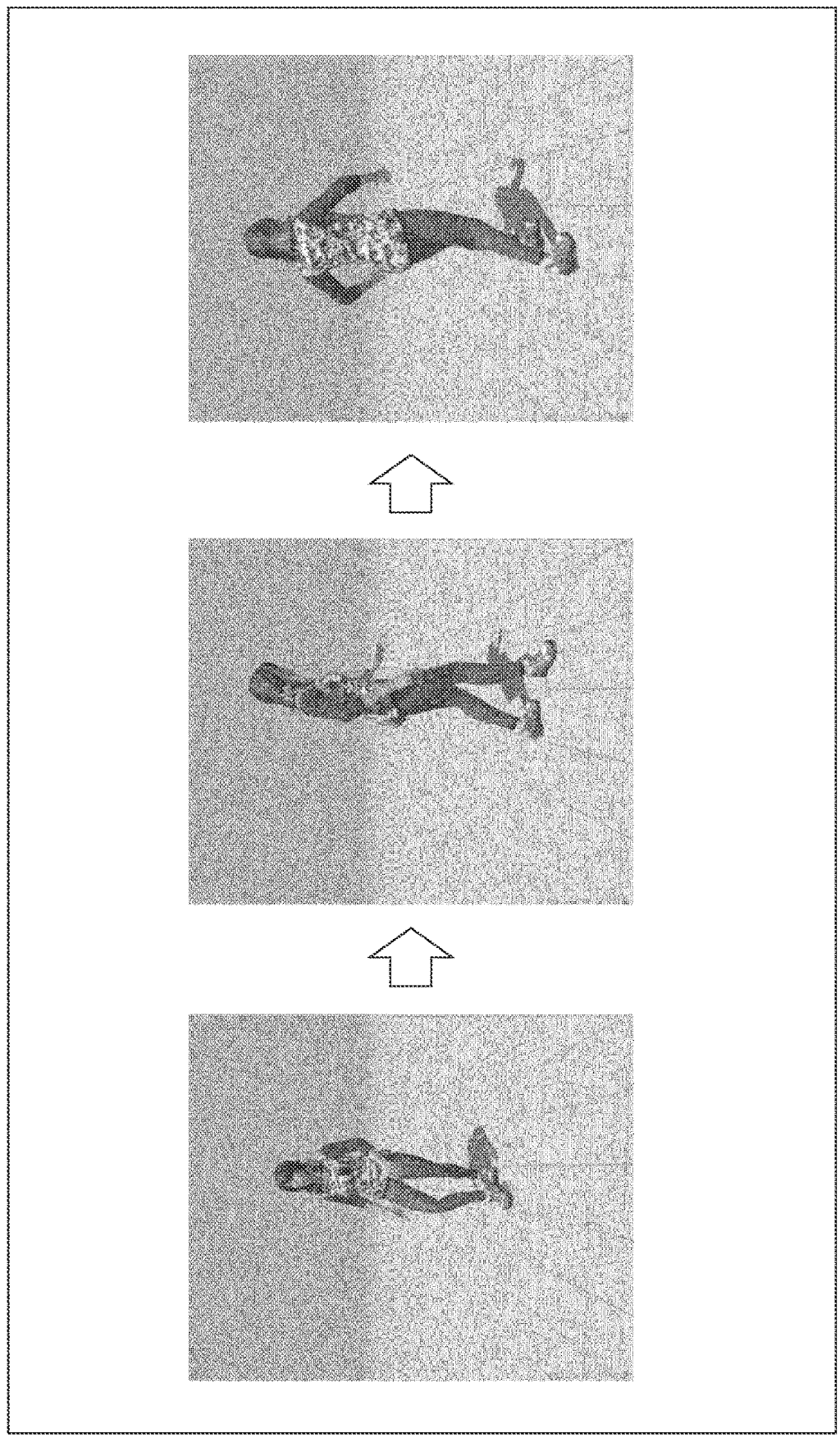
FIG. 14 illustrates an example of a motion that allows for reliable acquisition of textures of a back.

FIG. 14 illustrates an example of a motion that allows for reliable acquisition of textures of a back. For example, imaging a user who is performing a motion of turning the user's back toward the RGB camera of the sensing device 12 while performing a cross step allows for reliable acquisition of textures of the back. Note that this motion is common to beginners and experienced users, and is a dance with a low difficulty level.

Figure 15:
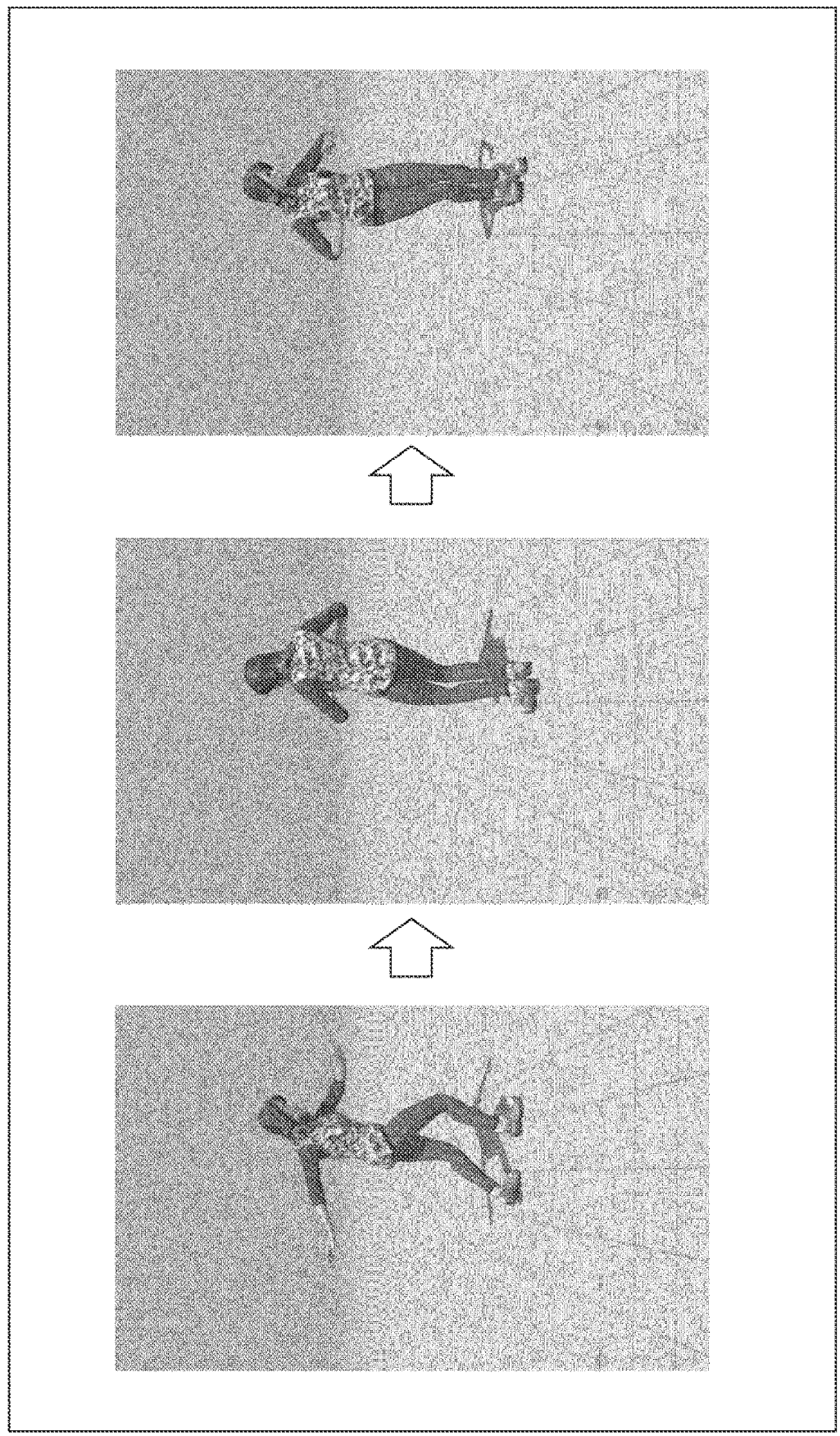
FIG. 15 illustrates an example of a motion that allows for reliable acquisition of textures of an entire circumference.

FIG. 15 illustrates an example of a motion that allows for reliable acquisition of textures of an entire circumference. For example, imaging a user who is performing a motion of spinning on a toe allows for reliable acquisition of textures of the entire circumference. Note that this motion is for experienced users, and is a dance with a high difficulty level.

Figure 16:
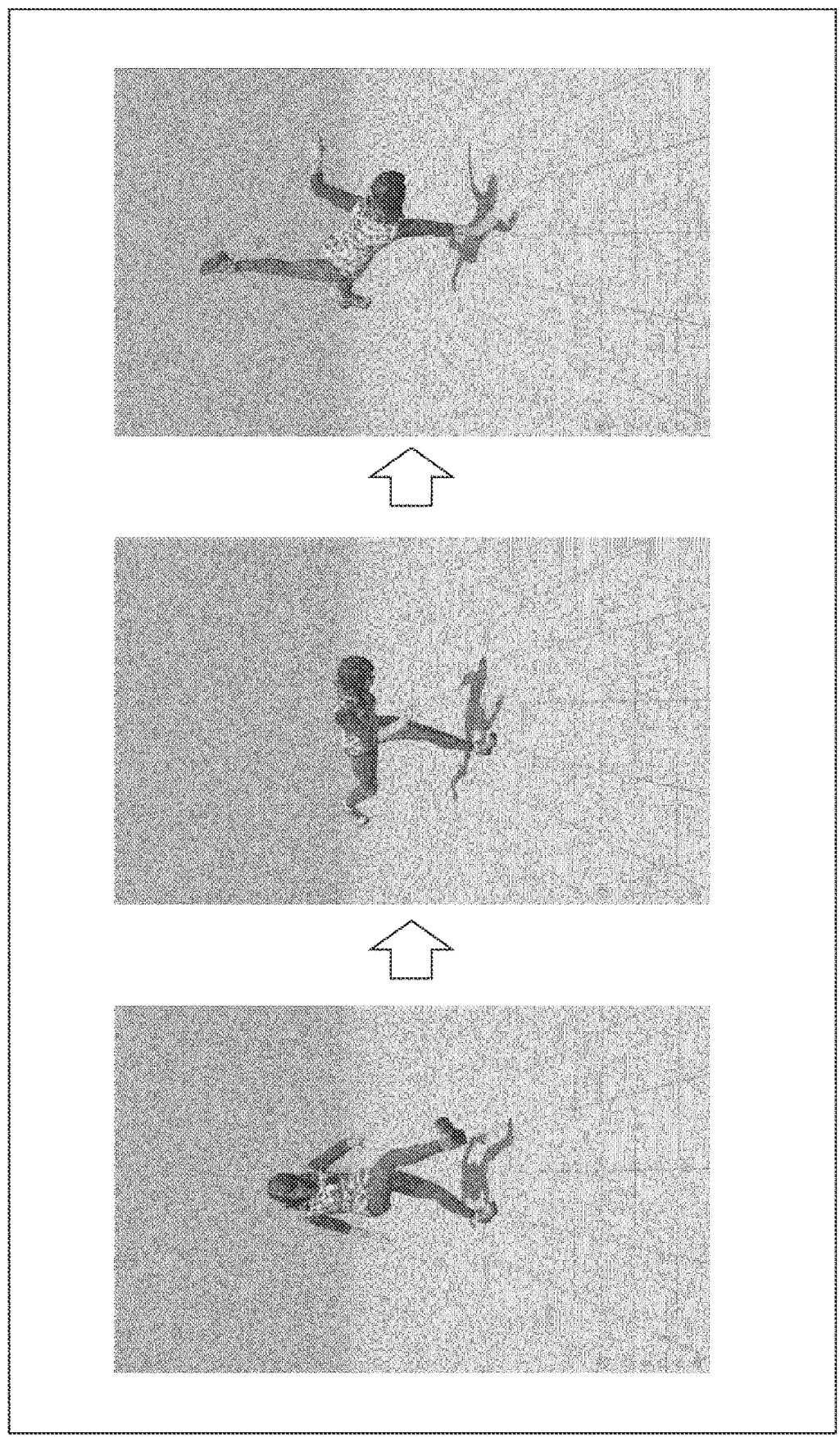
FIG. 16 illustrates an example of a motion that allows for high coverage and acquisition of textures.

FIG. 16 illustrates an example of a motion that allows for high coverage and acquisition of textures. For example, imaging a user who is performing a motion of turning the whole body while fully swinging both arms and legs allows for high coverage and reliable acquisition of textures. Note that this motion is for experienced users, and is a dance with a high difficulty level.

The motion generation unit 53 generates, with reference to the user's attribute and movement proficiency level, a motion in which the difficulty level such as for beginners or for experienced users is set, for each part for which textures are to be acquired (that is, an area where textures have not been acquired) as described above.

<Appropriate Textures for Each Motion>

A position and a time that allow for acquisition of appropriate textures for each motion will be described with reference to FIGS. 17 to 21.

Figure 17:
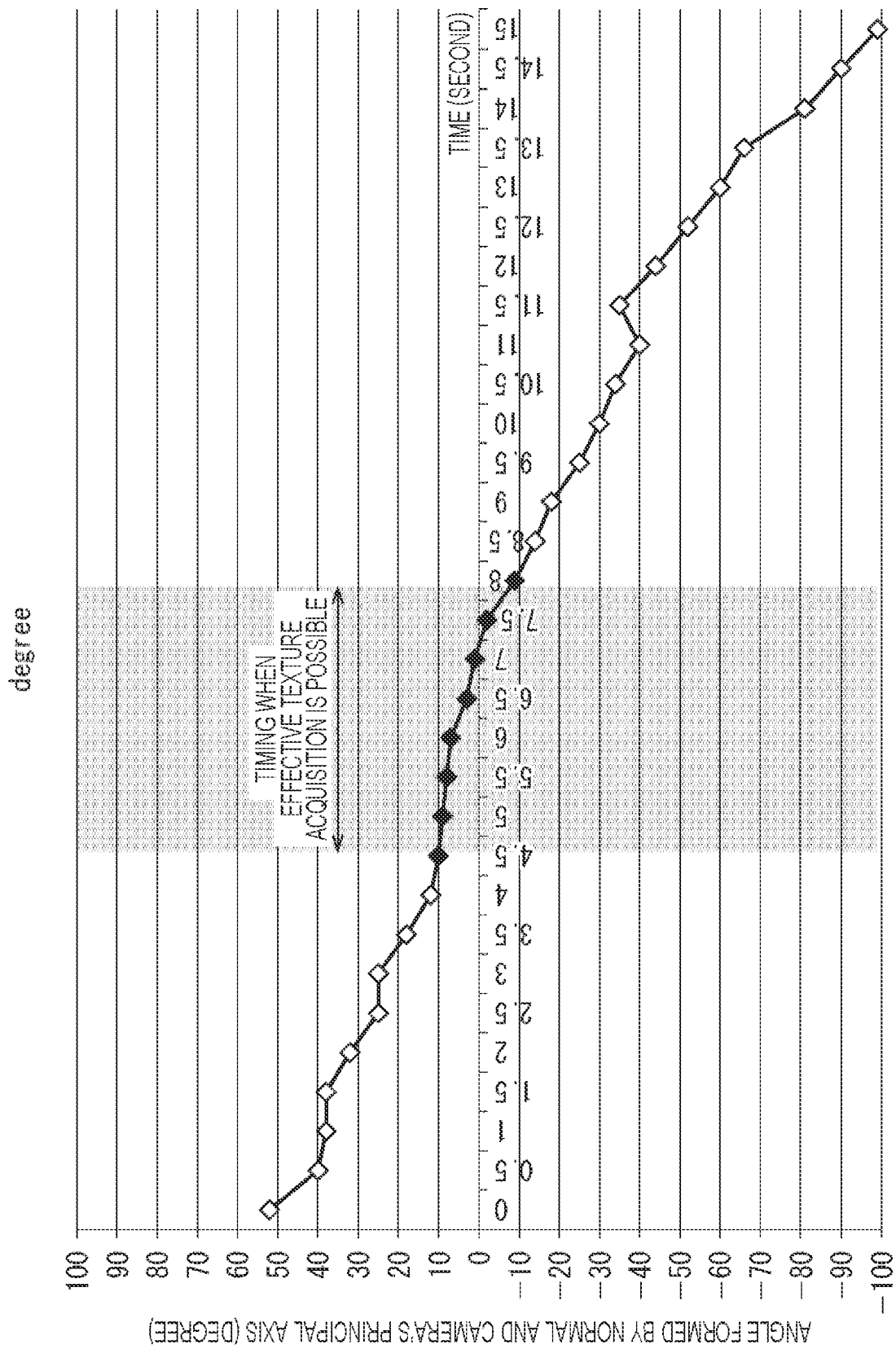
FIG. 17 illustrates a timing when appropriate texture acquisition is possible.

FIG. 17 illustrates an example of a timing when effective texture acquisition is possible.

In FIG. 17, a vertical axis represents the angle θ formed by the principal axis VD of the RGB camera of the sensing device 12 and the polygon normal SN, and a horizontal axis represents the time t during which the polygon has been exposed in front of the RGB camera of the sensing device 12. Then, on the basis of the angle θ and the time t, a timing when effective texture acquisition is possible is obtained.

In FIG. 17, the timing when effective texture acquisition is possible is when the angle θ formed by the principal axis VD of the RGB camera of the sensing device 12 and the polygon normal SN is in the range of +10° to −10°, and the time t during which the polygon has been exposed in front of the RGB camera of the sensing device 12 is in the range of about 5 seconds to about 8 seconds.

Such a timing when effective texture acquisition is possible can be calculated from a registered motion by, for example, simulating a position (orientation) and a timing at which the angle θ formed by the principal axis VD of the RGB camera of the sensing device 12 and the polygon normal SN is minimized. For example, when a motion is registered, the angle θ is simulated for each polygon in time units. Then, a necessary change in orientation is calculated so that a time during which effective texture acquisition is possible can be secured during the motion, or the motion takes place right in front the RGB camera of the sensing device 12, and thus the motion is generated by the motion generation unit 53.

Figure 18:
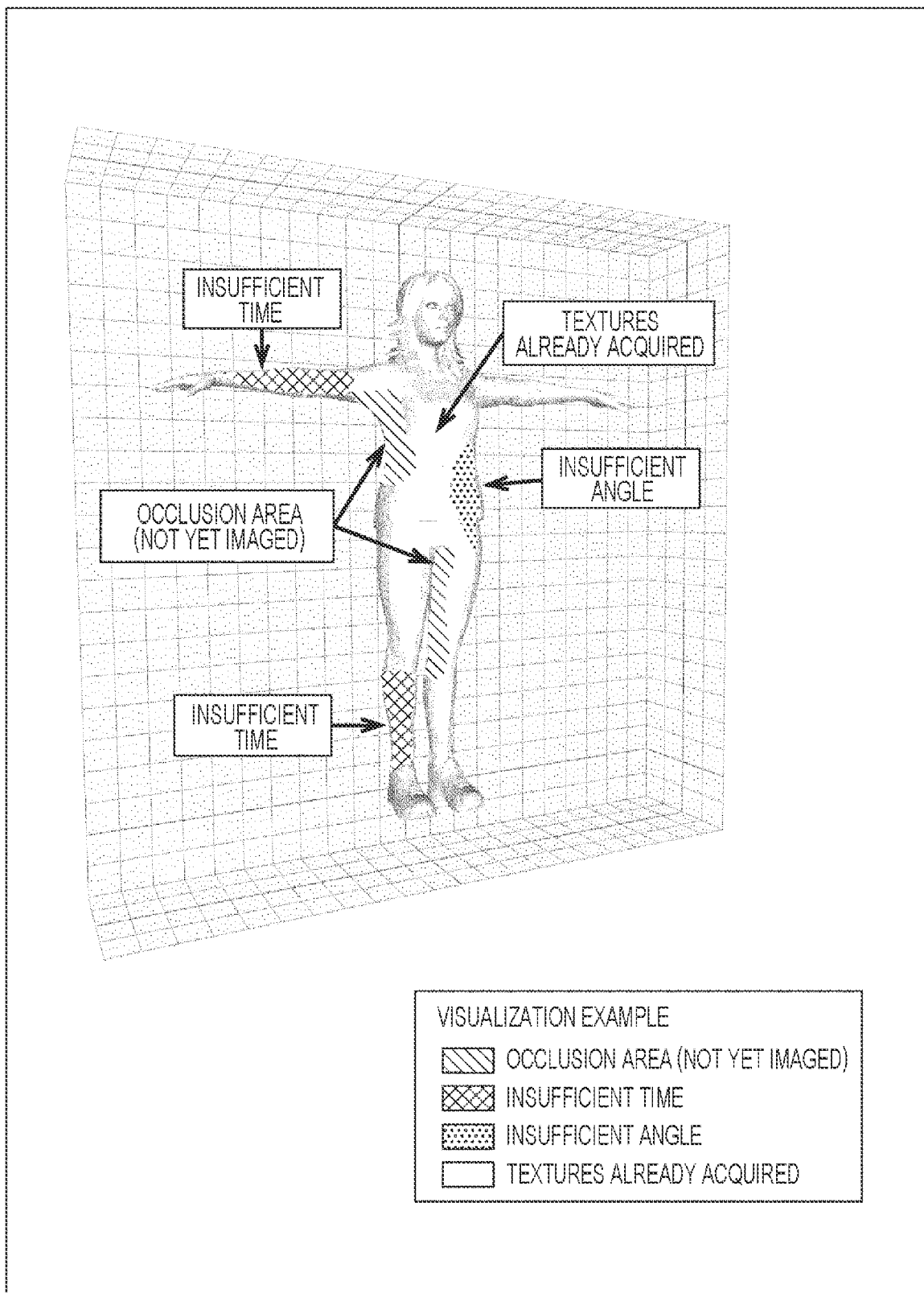
FIG. 18 illustrates an example of a texture acquisition state visualization map.

FIG. 18 illustrates an example of a texture acquisition state visualization map.

For example, after a user has freely performed an action for a certain period of time, the texture acquisition state visualization map creation unit 74 can create a texture acquisition state visualization map on the basis of a determination result for each polygon.

In the example illustrated in FIG. 18, in accordance with a result of determination by the texture acquisition condition determination unit 73, a texture acquisition state visualization map is created in which each of an occlusion area (not yet imaged), an area where the time is insufficient (e.g., the time t is less than 1 second), an area where the angle is insufficient (e.g., the angle θ is 10° or more), and an area where textures have already been acquired is classified with a different hatching. As a matter of course, the texture acquisition state visualization map is not limited to the example illustrated in FIG. 18, and may show the classification with different colors in accordance with the result of determination by the texture acquisition condition determination unit 73 as in a heat map, for example.

Figure 19:
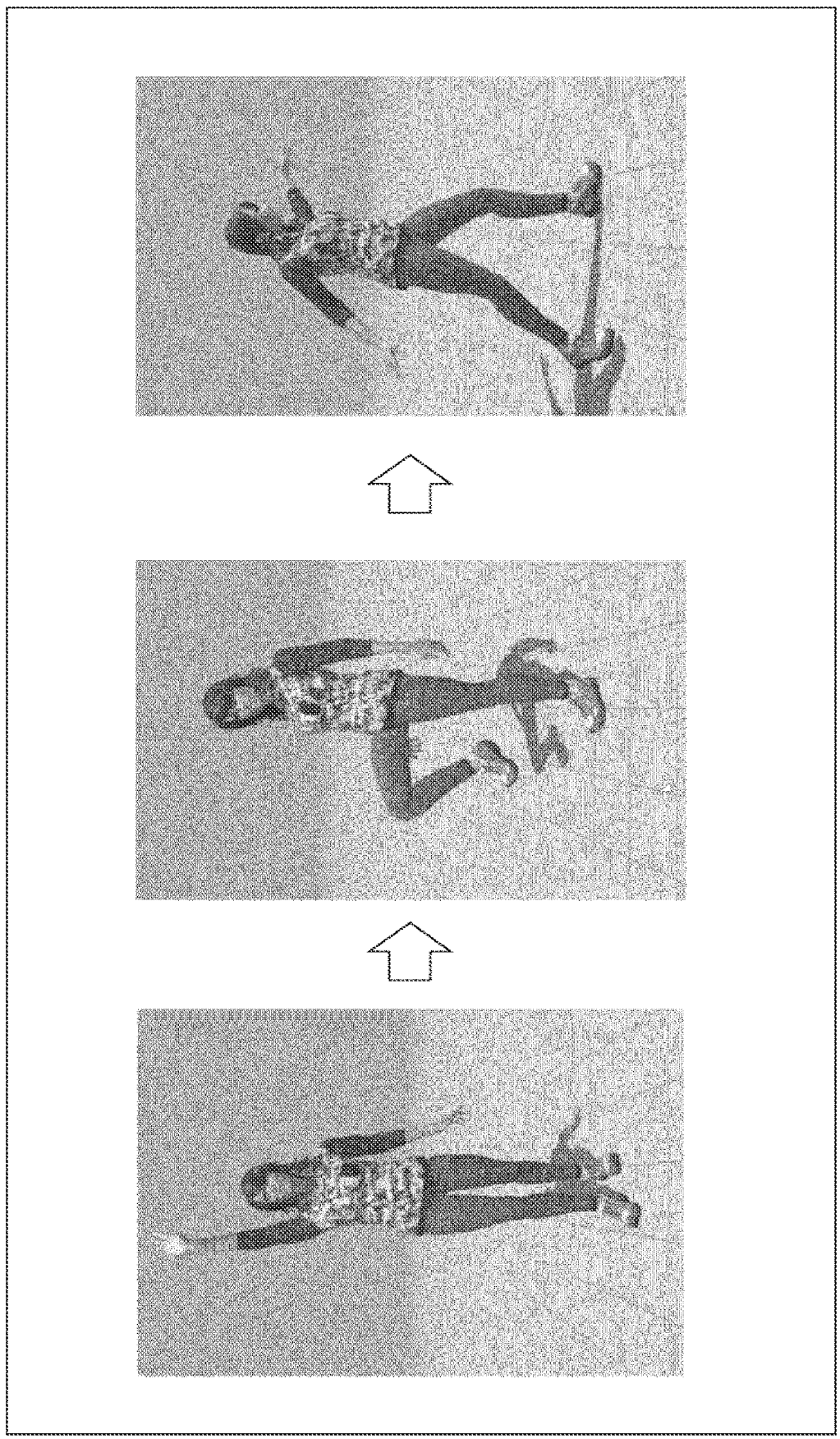
FIG. 19 illustrates an example of a motion for beginners.
Figure 20:
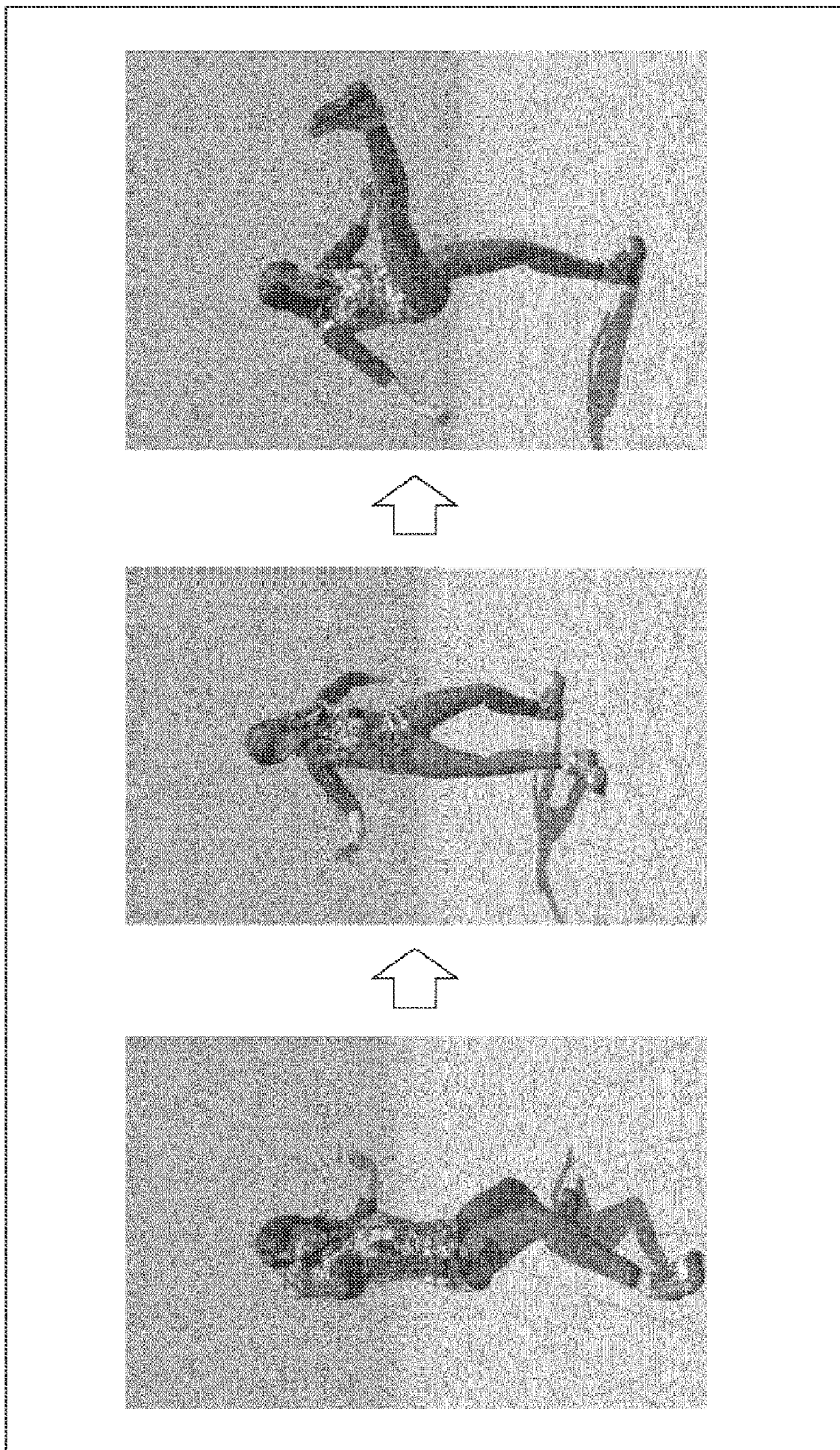
FIG. 20 illustrates an example of a motion for experienced users.

FIG. 19 illustrates an example of a motion for beginners, and FIG. 20 illustrates an example of a motion for experienced users.

For example, the motion generation unit 53 can generate a motion for beginners and a motion for experienced users by combining a variety of motions recorded in the motion recording unit 51 in consideration of the priority of an area to be filled with textures, factors (distance d, angle θ, and time t) in a case of a failure to acquire the textures, and the user's attributes and proficiency level. For example, a motion for beginners is a slow action like a warm-up exercise, which is a movement that causes the armpits, the crotch, and the like to be visible as illustrated in FIG. 19. On the other hand, a motion for experienced users is a movement that causes the armpits, the crotch, and the like to be visible while incorporating an action like a karate kata as illustrated in FIG. 20, for example.

Presentation of an optimum position, orientation, and speed of movement will be described with reference to FIGS. 21A and 21B.

Figure 21A:
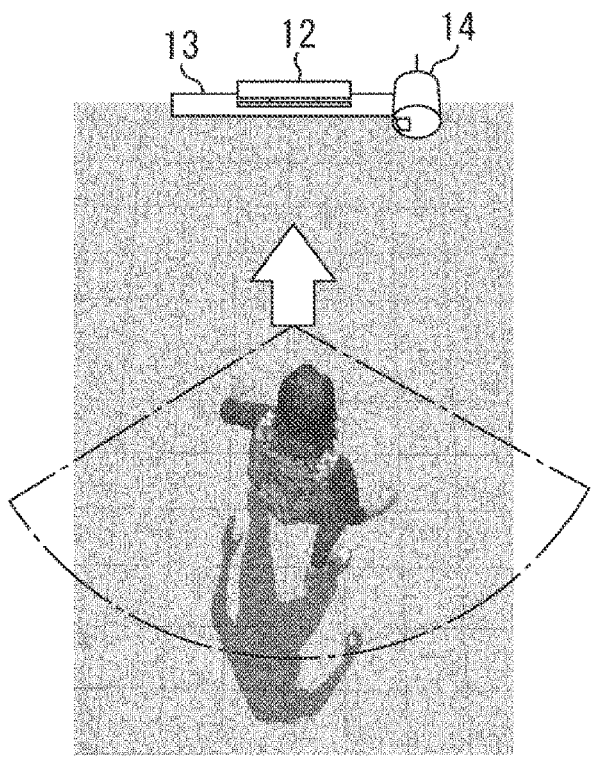
FIGS. 21A and 21B illustrate presentation of an optimum position, orientation, and speed of movement.
Figure 21B:
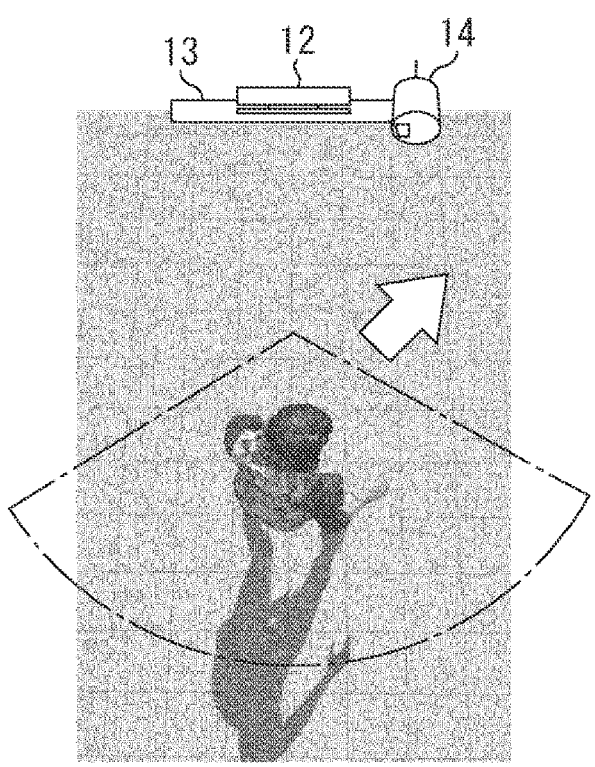

For example, an arrow illustrated in FIGS. 21A and 21B are guide images projected onto a floor surface by the projector 14 to guide a user to a range where the sensing device 12 can perform sensing (a range defined by an alternate long and short dash line illustrated). Such an arrow can be presented to guide the user to the optimum position and orientation for capturing of a color image and a depth image by the sensing device 12. Furthermore, a video, a sound, or the like may be used to guide the user so that the optimum speed of movement can be achieved.

This allows, for example, a CG image obtained by rendering a 3D model of a motion serving as an example to be displayed on the display device 13, and an arrow for guiding a user to be projected on the projector 14, so that the user can perform a movement so as to reproduce the motion at the optimum position and orientation for sensing by the sensing device 12.

As described above, the 3D image system 11 automatically determines whether high-quality textures have been acquired and which area has not been filled with textures, so that textures can be acquired without a photographer and while a natural movement is being made. For example, in processing of filling a texture area that has not been imaged, an action that most efficiently helps the area to be filled with textures is determined on the basis of a past movement of the same person and a registered movement pattern that is carried out in a usual workout, and a navigation is provided. This allows for acquisition of textures with high coverage without forcing a user to make any special movement.

Furthermore, in the present embodiment, when a 3D model of a person is generated under a simple shooting system environment, attributes such as the gender and age of a user serving as a subject are analyzed from a color image and a depth image that have been input. As a result, it is possible to perform, for example, determination on the proficiency level on the basis of a movement and determination on an occlusion area of textures for a 3D model, so that a motion can be generated for the purpose of acquiring high-definition textures and improving the coverage. In addition, a navigation for guiding the user to an actual movement may be presented so that a 3D model (that is, a mesh and textures) can be generated while a natural movement is being made even in a self-shooting environment without a photographer.

<Configuration Example of Computer>

Next, the series of pieces of processing (information processing method) described above can be performed not only by hardware or also by software. When the series of pieces of processing is performed by software, a program constituting the software is installed on a general-purpose computer or the like.

Figure 22:
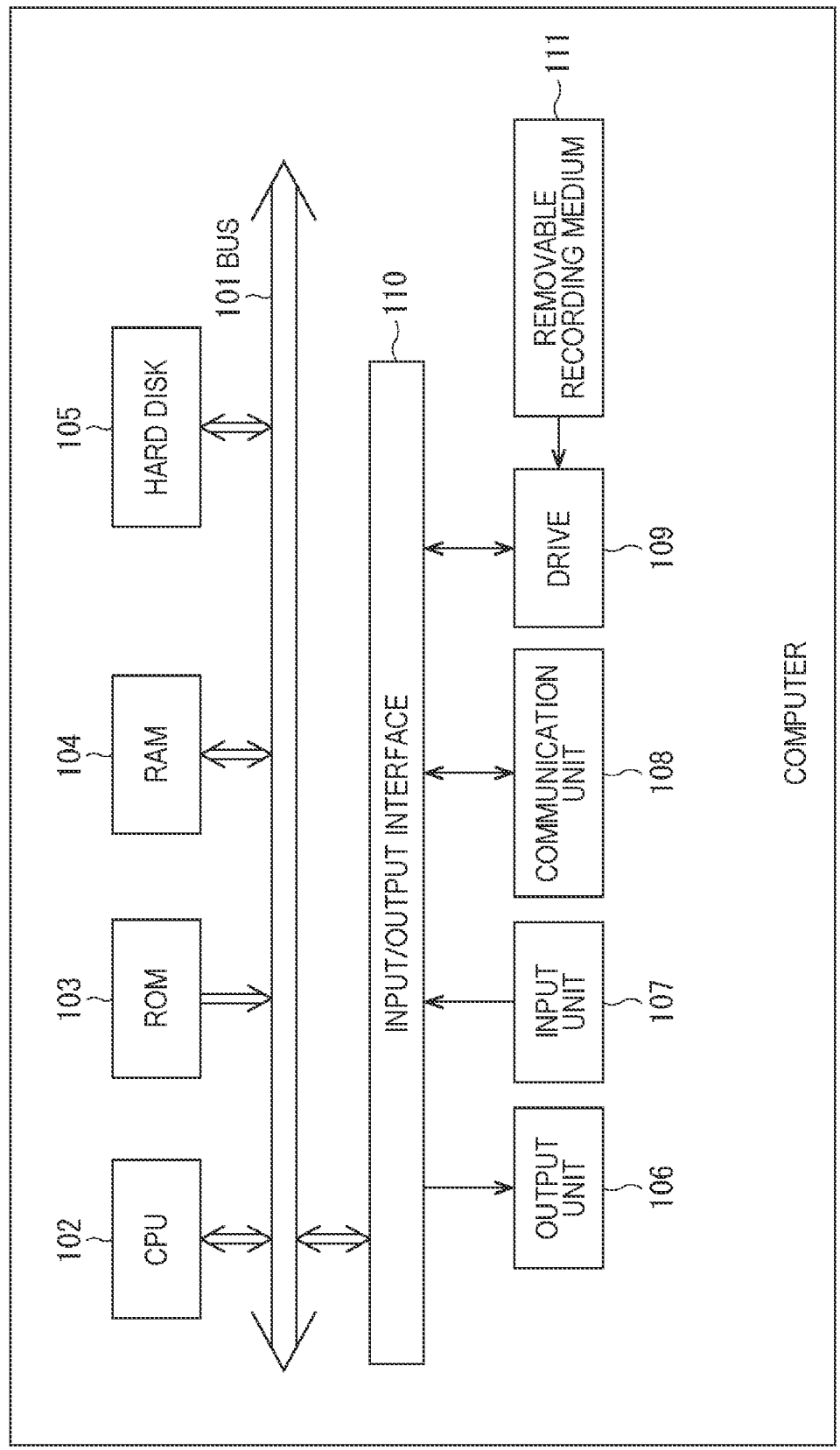

FIG. 22 is a block diagram illustrating a configuration example of an embodiment of a computer on which a program for executing the series of pieces of processing described above is installed.

The program can be recorded in advance on a hard disk 105 or a ROM 103 as a recording medium built in the computer.

Alternatively, the program can be stored (recorded) in a removable recording medium 111 driven by a drive 109. A removable recording medium such as the removable recording medium 111 can be provided as so-called package software. Here, examples of the removable recording medium 111 include a flexible disk, a compact disc read only memory (CD-ROM), a magneto optical (MO) disk, a digital versatile disc (DVD), a magnetic disk, and a semiconductor memory.

Note that the program can be installed on the computer from the removable recording medium 111 as described above, or can be downloaded to the computer via a communication network or a broadcasting network and installed on the built-in hard disk 105. That is, for example, the program can be transferred wirelessly from a download site to the computer via an artificial satellite for digital satellite broadcasting, or can be transferred by wire to the computer via a network such as a local area network (LAN) or the Internet.

The computer has a built-in central processing unit (CPU) 102, and the CPU 102 is connected with an input/output interface 110 via a bus 101.

When a command is input via the input/output interface 110 by, for example, a user operating an input unit 107, the CPU 102 executes the program stored in the read only memory (ROM) 103 in accordance with the command. Alternatively, the CPU 102 loads the program stored in the hard disk 105 into a random access memory (RAM) 104 and executes the program.

Thus, the CPU 102 performs processing in accordance with the above-described flowchart or processing performed with the configuration of the above-described block diagram. Then, the CPU 102 causes a result of the processing to be, as needed, for example, via the input/output interface 110, output from an output unit 106, transmitted from a communication unit 108, or recorded on the hard disk 105.

Note that the input unit 107 is constituted by a keyboard, a mouse, a microphone, or the like. Furthermore, the output unit 106 is constituted by a liquid crystal display (LCD), a speaker, or the like.

Here, in the present specification, the processing to be performed by the computer in accordance with the program does not always need to be performed in chronological order as described as the flowchart. That is, the processing to be performed by the computer in accordance with the program also includes pieces of processing that are executed in parallel or individually (e.g., parallel processing or processing by object).

Furthermore, the program may be processed by one computer (processor), or may be processed by distributed processing by a plurality of computers. Moreover, the program may be transferred to a distant computer and executed.

Moreover, in the present specification, a system means a set of a plurality of components (devices, modules (parts), and the like), and it does not matter whether or not all components are in the same housing. Consequently, a plurality of devices housed in separate housings and connected via a network, and one device having a plurality of modules housed in one housing are both systems.

Furthermore, for example, a configuration described as one device (or processing unit) may be divided and configured as a plurality of devices (or processing units). Conversely, configurations described above as a plurality of devices (or processing units) may be combined and configured as one device (or processing unit). Furthermore, as a matter of course, a configuration other than those described above may be added to the configurations of the devices (or the processing units). Moreover, as long as the configuration and operation of the entire system remain substantially the same, a part of the configuration of a certain device (or processing unit) may be included in the configuration of another device (or another processing unit).

Furthermore, for example, the present technology can have a cloud computing configuration in which a plurality of apparatuses shares one function and collaborates in processing via a network.

Furthermore, for example, the program described above can be executed by any device. In that case, the device is only required to have necessary functions (functional blocks and the like) and be able to obtain necessary information.

Furthermore, for example, each step described in the above-described flowchart can be executed by one device or can be shared by a plurality of devices. Moreover, when a plurality of pieces of processing is included in one step, the plurality of pieces of processing included in that step can be executed by one device or can be shared by a plurality of devices. In other words, a plurality of pieces of processing included in one step may be processed as a plurality of steps. Conversely, processing described as a plurality of steps may be collectively executed as one step.

Note that the program to be executed by the computer may be configured so that the steps described are processed in chronological order as described in the present specification, or the steps are processed in parallel or processed individually when needed, for example, when a call is made. That is, as long as no contradiction arises, the steps may be processed in an order different from the order described above. Moreover, the program may be configured so that the steps described are processed in parallel with processing of another program, or may be executed in combination with processing of another program.

Note that each of a plurality of technologies related to the present technology described in the present specification can be carried out independently and individually as long as no contradiction arises. As a matter of course, any two or more technologies related to the present technology may be used together and carried out. For example, some or all of the technologies related to the present technology described in any one of the embodiments may be carried out in combination with some or all of the technologies related to the present technology described in another embodiment. Furthermore, some or all of any of the technologies related to the present technology described above may be carried out in combination with another technology that is not described above.

<Examples of Combination of Configurations>

Note that the present technology can also be configured as described below.

(1)

An information processing apparatus including:

a motion generation unit that generates, on the basis of a state of acquisition of textures that constitute a 3D model of a user, a motion for imaging an area where the textures have not been acquired; and a navigation execution unit that provides a navigation for making the user execute an action in accordance with the motion generated by the motion generation unit.

(2)

The information processing apparatus according to (1), further including an attribute estimation unit that estimates an attribute and a movement proficiency level of the user, in which the motion generation unit generates the motion by referring to the attribute and the movement proficiency level of the user estimated by the attribute estimation unit.

(3)

The information processing apparatus according to (1) or (2), further including a determination unit that determines, for each polygon of a mesh that constitutes the 3D model, whether or not the textures have been appropriately acquired, in which the motion generation unit generates the motion by referring to an area determined by the determination unit to be an area where the textures have not been appropriately acquired.

(4)

The information processing apparatus according to (3), further including a map creation unit that creates a map in which the state of acquisition of the textures is visualized on the basis of a result of the determination by the determination unit.

(5)

The information processing apparatus according to (4), in which the map creation unit performs visualization on the map for each factor that has caused a failure to acquire the textures.

(6)

The information processing apparatus according to any one of (3) to (5), in which the determination unit uses, as a determination condition for determining whether or not the textures have been appropriately acquired, an angle formed by a principal axis of an imaging device that images the user and a normal of the polygon for which the determination is to be made.

(7)

The information processing apparatus according to any one of (3) to (6), in which the determination unit uses, as a determination condition for determining whether or not the textures have been appropriately acquired, a time during which the polygon for which the determination is to be made has been exposed in front of an imaging device that images the user.

(8)

The information processing apparatus according to any one of (3) to (7), in which the determination unit uses, as a determination condition for determining whether or not the textures have been appropriately acquired, a distance from an imaging device that images the user to the polygon for which the determination is to be made.

(9)

An information processing method including, by an information processing apparatus that performs 3D model generation processing:

generating, on the basis of a state of acquisition of textures that constitute a 3D model of a user, a motion for imaging an area where the textures have not been acquired; and providing a navigation for making the user execute an action in accordance with the generated motion.

(10)

A program that causes a computer of an information processing apparatus that performs 3D model generation processing to execute processing including:

generating, on the basis of a state of acquisition of textures that constitute a 3D model of a user, a motion for imaging an area where the textures have not been acquired; and providing a navigation for making the user execute an action in accordance with the generated motion.

Note that the present embodiment is not limited to the embodiment described above, and can be modified in various ways within a scope of the present disclosure. Furthermore, the effects described herein are merely illustrative and are not intended to be restrictive, and other effects may be obtained.

REFERENCE SIGNS LIST 11 3D image system
12 Sensing device
13 Display device
14 Projector
15 Information processing apparatus
21 Image acquisition unit
22 Image information analysis unit
23 Motion tracking unit
24 Modeling unit
25 Motion presentation unit
26 Rendering unit
27 Output control unit
28 Texture acquisition processing unit
31 Feature amount detection unit
32 Attribute estimation unit
41 Mesh generation unit
42 Texture generation unit
51 Motion recording unit
52 Motion analysis unit
53 Motion generation unit
61 Display control unit
62 Projection control unit
71 Navigation execution unit
72 Simulation unit
73 Texture acquisition condition determination unit
74 Texture acquisition state visualization map creation unit

The invention claimed is:

1. An information processing apparatus, comprising:
circuitry configured to:
    detect an unacquired area of where a texture of a 3D model of a user is not acquired;
    generate a motion for imaging the unacquired area;
    generate a navigation map visualizing the unacquired area; and
    control a display device to display the motion and the navigation map.

2. The information processing apparatus according to claim 1, wherein the circuitry is further configured to:
    estimate an attribute and a movement proficiency level of the user, and
    generate the motion by referring to the attribute and the movement proficiency level of the user.

3. The information processing apparatus according to claim 1, wherein the circuitry is further configured to:
    determine whether each polygon of a mesh of the 3D model includes the unacquired area.

4. The information processing apparatus according to claim 1, wherein the circuitry is further configured to visualize, on the navigation map, each factor that has caused the unacquired area.

5. The information processing apparatus according to claim 3, wherein the circuitry is configured to detect the unacquired area on a basis of an angle between a principal axis of an imaging device and a normal of a part of the user corresponding to a polygon of the mesh.

6. The information processing apparatus according to claim 3, wherein the circuitry is configured to detect the unacquired area on a basis of a time during which a part of the user corresponding to a polygon of the mesh has been exposed in front of an imaging device.

7. The information processing apparatus according to claim 3, wherein the circuitry is configured to detect the unacquired area on a basis of a distance between an imaging device and a part of the user corresponding to a polygon of the mesh.

8. An information processing method, comprising,
by an information processing apparatus that performs 3D model generation processing:
    detecting an unacquired area of where a texture of a 3D model of a user is not acquired;
    generating a motion for imaging the unacquired area;
    generating a navigation map visualizing the unacquired area; and
    controlling a display device to display the motion and the navigation map.

9. A non-transitory computer-readable medium having stored thereon, computer-executable instructions which, when executed by a computer of an information processing apparatus that performs 3D model generation processing, cause the computer to execute operations, the operations comprising:
    detecting an unacquired area of where a texture of a 3D model of a user is not acquired;
    generating a motion for imaging the unacquired area;
    generating a navigation map visualizing the unacquired area; and
    controlling a display device to display the motion and the navigation map.

* * * * *